United States Patent
Jonely

(10) Patent No.: US 9,411,993 B2
(45) Date of Patent: Aug. 9, 2016

(54) RFID DETECTION SYSTEM

(71) Applicant: Master Lock Company, Oak Creek, WI (US)

(72) Inventor: Michael B. Jonely, Whitewater, WI (US)

(73) Assignee: Master Lock Company LLC, Oak Creek, WI (US)

(*) Notice: Subject to any disclaimer, the term of this patent is extended or adjusted under 35 U.S.C. 154(b) by 225 days.

(21) Appl. No.: 13/830,430

(22) Filed: Mar. 14, 2013

(65) Prior Publication Data

US 2013/0335199 A1 Dec. 19, 2013

Related U.S. Application Data

(60) Provisional application No. 61/661,173, filed on Jun. 18, 2012.

(51) Int. Cl.
*G06K 7/10* (2006.01)

(52) U.S. Cl.
CPC ........ *G06K 7/10207* (2013.01); *G06K 7/10128* (2013.01)

(58) Field of Classification Search
CPC .......... G06K 7/10128; G06K 7/10207; H04W 4/008; G06Q 10/087
See application file for complete search history.

(56) References Cited

U.S. PATENT DOCUMENTS 5,463,376 A * 10/1995 Stoffer ............... G08B 13/2414
340/551
5,874,896 A * 2/1999 Lowe ................... G07G 1/0054
340/13.26
6,476,708 B1 * 11/2002 Johnson ............... G06K 7/0008
340/10.34
7,839,289 B2 11/2010 Chung et al.
2006/0220846 A1 * 10/2006 Stratmann .......... H03K 17/9525
340/545.2
2008/0290990 A1 * 11/2008 Schaffzin ........... G07C 9/00182
340/5.64

(Continued)

FOREIGN PATENT DOCUMENTS

EP          2 378 748 A1    10/2011
WO     WO-01/22118 A9       10/2002

(Continued)

OTHER PUBLICATIONS

International Preliminary Report on Patentability for PCT Application No. PCT/US2013/031647, dated Dec. 23, 2014, 11 pages.

(Continued)

*Primary Examiner* — Laura Nguyen
(74) *Attorney, Agent, or Firm* — Foley & Lardner LLP

(57) ABSTRACT

Systems and methods for use in detecting the presence of an RFID device are provided. One RFID detection system includes a detection circuit that includes an oscillating circuit. The detection circuit is configured to hold the RFID detection system in a low power mode in which the RFID detection system is configured to not actively attempt to communicate with nearby RFID devices. The detection circuit is further configured to monitor one or more parameters of a signal of the oscillating circuit and compare the one or more monitored parameters to one or more reference parameters. The detection circuit is further configured to, based on the comparison, determine whether to transition the RFID detection system from the low power mode into an active communication mode in which the RFID detection system is configured to actively attempt to communicate with nearby RFID devices.

16 Claims, 17 Drawing Sheets

(56) References Cited

U.S. PATENT DOCUMENTS

| | | | |
|---|---|---|---|
| 2010/0045443 A1 | 2/2010 | Steeves | |
| 2010/0052865 A1 | 3/2010 | Eckstein | |
| 2010/0194535 A1 | 8/2010 | Pedigo | |
| 2010/0194635 A1 | 8/2010 | An et al. | |
| 2010/0282849 A1* | 11/2010 | Mair | G06K 7/10128 235/439 |
| 2011/0025410 A1 | 2/2011 | Hill | |
| 2011/0304497 A1 | 12/2011 | Molyneux et al. | |
| 2011/0309931 A1 | 12/2011 | Rose | |
| 2012/0176227 A1* | 7/2012 | Nikitin | G06K 7/10356 340/10.2 |
| 2012/0212329 A1* | 8/2012 | Blair | A61B 19/44 340/10.1 |
| 2013/0225071 A1* | 8/2013 | Royston | H04B 5/0031 455/41.1 |
| 2013/0254574 A1 | 9/2013 | Zacchio et al. | |

FOREIGN PATENT DOCUMENTS

| | | |
|---|---|---|
| WO | WO-2005/093456 A1 | 10/2005 |
| WO | WO-2005/109329 A1 | 11/2005 |
| WO | WO-2006/088583 A2 | 8/2006 |
| WO | WO-2006/130197 A2 | 12/2006 |
| WO | WO-2011/008884 A1 | 1/2011 |
| WO | WO-2011/132190 A2 | 10/2011 |
| WO | WO-2012/068159 A1 | 5/2012 |

OTHER PUBLICATIONS

International Search Report and Written Opinion for PCT Application No. PCT/US2013/031647, mail date May 8, 2014, 21 pages.

U.S. Office Action, U.S. Appl. No. 13/830,973, 11 pages (Sep. 25, 2015).

* cited by examiner

The recovered signal waveform showing residual noise from Fm and harmonics when no tag is present.

The recovered signal waveform showing a well defined signal at 2Fm when an RFID tag is present.

RFID DETECTION SYSTEM

CROSS-REFERENCE TO RELATED APPLICATIONS

The present application claims the benefit of U.S. Provisional Patent Application Ser. No. 61/661,173, filed Jun. 18, 2012, titled "RFID Detection System," which is incorporated herein in its entirety.

BACKGROUND

The present disclosure relates generally to the field of wireless identification systems. More specifically, the present disclosure relates to systems and methods for detecting when a wireless identification device, such as a Radio Frequency Identification (RFID) card or tag, has moved within the proximity of a wireless identification system.

RFID systems allow for convenient wireless identification and tracking of people and/or objects for various types of applications. For example, RFID systems may be used in access control applications, such as allowing users to access protected areas by holding an RFID card within proximity of a card reader coupled to a door lock. Other example applications of RFID systems include tracking products (e.g., in a retail environment), tracking people in a hospital environment, or enabling users to wirelessly process payments (e.g., using a wireless point-of-sale RFID detection system).

An RFID detection system can identify an RFID device (e.g., an RFID tag or card) when the detection system detects that the RFID device has entered the proximity of the detection system. One way to detect when an RFID device has come within proximity of the detection system is to continuously keep the detection system in an active polling mode. In the active polling mode, the detection system transmits polling signals that RFID devices within proximity of the detection system can receive. The RFID devices may then respond to the polling signals, indicating to the detection circuit that the devices are within proximity of the detection circuit and that an identification determination should be made by the detection circuit with respect to the devices.

SUMMARY

One embodiment of the disclosure relates to an RFID detection system that includes a detection circuit configured to detect the presence of one or more RFID devices near the RFID detection system. The detection circuit includes an oscillating circuit. The detection circuit is configured to hold the RFID detection system in a low power mode in which the RFID detection system is configured to not actively attempt to communicate with nearby RFID devices. The detection circuit is further configured to monitor one or more parameters of a signal of the oscillating circuit and compare the one or more monitored parameters to one or more reference parameters. The detection circuit is further configured to, based on the comparison, determine whether to transition the RFID detection system from the low power mode into an active communication mode in which the RFID detection system is configured to actively attempt to communicate with nearby RFID devices.

In some implementations, the oscillating circuit has an operating frequency and includes a sense antenna having a resonant frequency that is tuned to be higher than the operating frequency. The one or more monitored parameters include a voltage of the oscillating circuit. Comparing the one or more monitored parameters to one or more reference parameters includes detecting a decrease in the voltage of the oscillating circuit, wherein a decrease in the voltage is indicative of the presence of an RFID device near the RFID detection system. When a decrease in the voltage is detected, the detection circuit is configured to switch the RFID detection system from the low power mode into the active communication mode.

In some implementations, the one or more monitored parameters comprise one or more frequencies of one or more signal components for a voltage signal in the detection circuit. In some such implementations, the one or more RFID devices have a resonant frequency, and the detection circuit is configured to sweep an operating frequency of the detection circuit across a range of frequencies, the range of frequencies including the resonant frequency of the one or more RFID devices. The sweeping is performed at a sweep frequency. The detection circuit is further configured to monitor the voltage signal in the detection circuit to determine whether the voltage signal includes a signal component having a frequency of approximately twice the sweep frequency. When it is determined that the voltage signal includes a signal component having a frequency of approximately twice the sweep frequency, the detection circuit is configured to switch the RFID detection system from the low power mode into the active communication mode. The detection circuit may be configured to estimate a relative distance between the RFID detection system and one of the one or more RFID devices based on a magnitude of the signal component having the frequency of approximately twice the sweep frequency. In some such implementations, the one or more RFID devices have a resonant frequency, and the detection circuit is configured to sweep an operating frequency of the detection circuit across a range of frequencies, the range of frequencies including the resonant frequency of the one or more RFID devices. The sweeping is performed at a sweep frequency. The detection circuit is configured to identify a component of the voltage signal in the detection circuit having a frequency approximately equal to the sweep frequency and to determine an amplitude of the component of the voltage signal having the frequency approximately equal to the sweep frequency. The detection circuit is configured to compare the determined amplitude to a reference voltage level and, when the amplitude is greater than the reference voltage level, switch the RFID detection system from the low power mode into the active communication mode.

In some implementations, the detection circuit is configured to sweep an operating frequency of the detection circuit across a range of frequencies. The detection circuit is configured such that the presence of one or more RFID devices near the RFID detection system causes a substantial change in the voltage signal near a resonant frequency of the one or more RFID devices and one or more objects other than the one or more RFID devices cause a change in the voltage signal across the range of frequencies.

Another embodiment of the disclosure relates to an RFID detection system. The RFID detection system includes an oscillating circuit having an operating frequency, the oscillating circuit including a sense antenna having a resonant frequency that is tuned to be higher than the operating frequency. The RFID detection system further includes a detection circuit configured to monitor a voltage of the oscillating circuit, wherein a decrease in the voltage is indicative of the presence of an RFID device near the RFID detection system. When the voltage decreases, the detection circuit is configured to switch the RFID detection system from a low power mode into an active communication mode.

In some implementations, the detection circuit is configured to sense a source of stray capacitance near the RFID detection system when the voltage of the oscillating circuit increases.

In some implementations, the oscillating circuit includes a crystal locked oscillator.

Another embodiment relates to a method that includes holding an RFID detection system in a low power mode in which the RFID detection system is configured to not actively attempt to communicate with nearby RFID devices. The RFID detection system includes an oscillating circuit. The method further includes monitoring one or more parameters of a signal of the oscillating circuit and comparing the one or more monitored parameters to one or more reference parameters. The method further includes, based on the comparison, determining whether to transition the RFID detection system from the low power mode into an active communication mode in which the RFID detection system is configured to actively attempt to communicate with nearby RFID devices.

In some implementations, the oscillating circuit has an operating frequency and includes a sense antenna having a resonant frequency that is tuned to be higher than the operating frequency, the one or more monitored parameters include a voltage of the oscillating circuit, and comparing the one or more monitored parameters to one or more reference parameters includes detecting a decrease in the voltage of the oscillating circuit, a decrease in the voltage being indicative of the presence of an RFID device near the RFID detection system. The method further includes switching the RFID detection system from the low power mode into the active communication mode when a decrease in the voltage is detected.

In some implementations, the one or more monitored parameters include one or more frequencies of one or more signal components for a voltage signal in the detection circuit. In some such implementations, the method further includes sweeping an operating frequency of the detection circuit across a range of frequencies. The range of frequencies includes the resonant frequency of the one or more one or more RFID devices. The sweeping is performed at a sweep frequency. The method further includes monitoring the voltage signal in the detection circuit to determine whether the voltage signal includes a signal component having a frequency of approximately twice the sweep frequency. When it is determined that the voltage signal includes a signal component having a frequency of approximately twice the sweep frequency, the method includes switching the RFID detection system from the low power mode into the active communication mode. The method may include estimating a relative distance between the RFID detection system and one of the one or more RFID devices based on a magnitude of the signal component having the frequency of approximately twice the sweep frequency. In some such implementations, the one or more RFID devices have a resonant frequency, and the method includes sweeping an operating frequency of the detection circuit across a range of frequencies. The range of frequencies includes the resonant frequency of the one or more RFID devices. The sweeping is performed at a sweep frequency. The method includes identifying a component of the voltage signal in the detection circuit having a frequency approximately equal to the sweep frequency, determining an amplitude of the component of the voltage signal having the frequency approximately equal to the sweep frequency, comparing the determined amplitude to a reference voltage level, and, when the amplitude is greater than the reference voltage level, switching the RFID detection system from the low power mode into the active communication mode.

In some implementations, the method includes sweeping an operating frequency of the detection circuit across a range of frequencies. The detection circuit is configured such that the presence of one or more RFID devices near the RFID detection system causes a substantial change in the voltage signal near a resonant frequency of the one or more RFID devices and one or more objects other than the one or more RFID devices cause a change in the voltage signal across the range of frequencies.

Another embodiment of the disclosure relates to an RFID detection system including a detection circuit configured to detect the presence of one or more RFID devices near the RFID detection system, the one or more RFID devices having a resonant frequency. The detection circuit is configured to sweep an operating frequency of the detection circuit across a range of frequencies. The range of frequencies includes the resonant frequency of the one or more RFID devices. The sweeping is performed at a sweep frequency. The detection circuit is further configured to monitor a voltage signal in the detection circuit to determine whether the voltage signal includes a signal component having a frequency of approximately twice the sweep frequency. When it is determined that the voltage signal includes a signal component having a frequency of approximately twice the sweep frequency, the RFID detection system is switched from a low power mode into an active communication mode.

In some implementations, the detection circuit is configured to estimate a relative distance between the RFID detection system and one of the one or more RFID devices based on a magnitude of the signal component having the frequency of approximately twice the sweep frequency.

In some implementations, the detection circuit is configured such that the presence of one or more RFID devices near the RFID detection system causes a change in the voltage signal at a frequency of approximately twice the sweep frequency and one or more objects other than the one or more RFID devices cause a change in the voltage signal across the range of frequencies.

In some implementations, the RFID detection system further includes a microprocessor configured to receive an output of the detection circuit and to set the RFID detection system in one of the low power mode and the active communication mode based on the output.

Another embodiment relates to a method including sweeping an operating frequency of a detection circuit across a range of frequencies. The detection circuit is configured to detect the presence of one or more RFID devices near an RFID detection system. The one or more RFID devices have a resonant frequency. The range of frequencies includes the resonant frequency of the one or more one or more RFID devices. The sweeping is performed at a sweep frequency. The method further includes monitoring a voltage signal in the detection circuit to determine whether the voltage signal includes a signal component having a frequency of approximately twice the sweep frequency. The method further includes, when it is determined that the voltage signal includes a signal component having a frequency of approximately twice the sweep frequency, switching the RFID detection system from a low power mode into an active communication mode.

In some implementations, the method includes estimating a relative distance between the RFID detection system and one of the one or more RFID devices based on a magnitude of the signal component having the frequency of approximately twice the sweep frequency.

In some implementations, the detection circuit is configured such that the presence of one or more RFID devices near the RFID detection system causes a change in the voltage signal at a frequency of approximately twice the sweep frequency and one or more objects other than the one or more RFID devices cause a change in the voltage signal across the range of frequencies.

In some implementations, the RFID detection system is configured to be embedded within a locking device, and the method further includes unlocking the locking device based on one or more signals received from the one or more RFID devices near the RFID detection system when the RFID detection system is in the active communication mode. In some such implementations, the locking device includes a padlock.

In some implementations, the method includes transmitting an output of the detection circuit to a microprocessor configured to set the RFID detection system in one of the low power mode and the active communication mode based on the output.

Another embodiment relates to an RFID detection system including a detection circuit configured to detect the presence of one or more RFID devices near the RFID detection system, the one or more RFID devices having a resonant frequency. The detection circuit is configured to sweep an operating frequency of the detection circuit across a range of frequencies, the range of frequencies including the resonant frequency of the one or more RFID devices. The sweeping is performed at a sweep frequency. The detection circuit is further configured to identify a component of a voltage signal in the detection circuit having a frequency approximately equal to the sweep frequency. The detection circuit is further configured to determine an amplitude of the component of the voltage signal having the frequency approximately equal to the sweep frequency. The detection circuit is yet further configured to compare the determined amplitude to a reference voltage level. When the amplitude is greater than the reference voltage level, the RFID detection system is switched from a low power mode into an active communication mode.

In some implementations, the detection circuit is configured to estimate a relative distance between the RFID detection system and one of the one or more RFID devices based on a magnitude of the signal component having the frequency approximately equal to the sweep frequency.

In some implementations, the detection circuit is configured such that the presence of one or more RFID devices near the RFID detection system causes a change in the voltage signal at the frequency approximately equal to the sweep frequency and one or more objects other than the one or more RFID devices cause a change in the voltage signal across the range of frequencies.

In some implementations of the embodiments disclosed herein, in the low power sleep mode, the detection circuit draws a current between 1 µA and 25 µA from an energy storage device of the RFID detection system.

In some implementations of the embodiments disclosed herein, the RFID detection system is configured to be embedded within a locking device and used in unlocking the locking device based on one or more signals received from the one or more RFID devices near the RFID detection system when the RFID detection system is in the active communication mode. In some such implementations, the locking device includes a padlock.

BRIEF DESCRIPTION OF THE DRAWINGS

FIG. 1 is a graph illustrating the magnitude of a signal at a network analyzer (e.g., coupled to an untuned magnetic field probe) without an RFID card present. FIG. 2 is a graph illustrating the magnitude of a signal at the network analyzer after an RFID card comes within proximity of the untuned magnetic field probe. The principle illustrated in the simulation graphs of FIGS. 1 and 2 is representative of a voltage change evaluated by some embodiments subsequently described.

DETAILED DESCRIPTION

Figure 1:
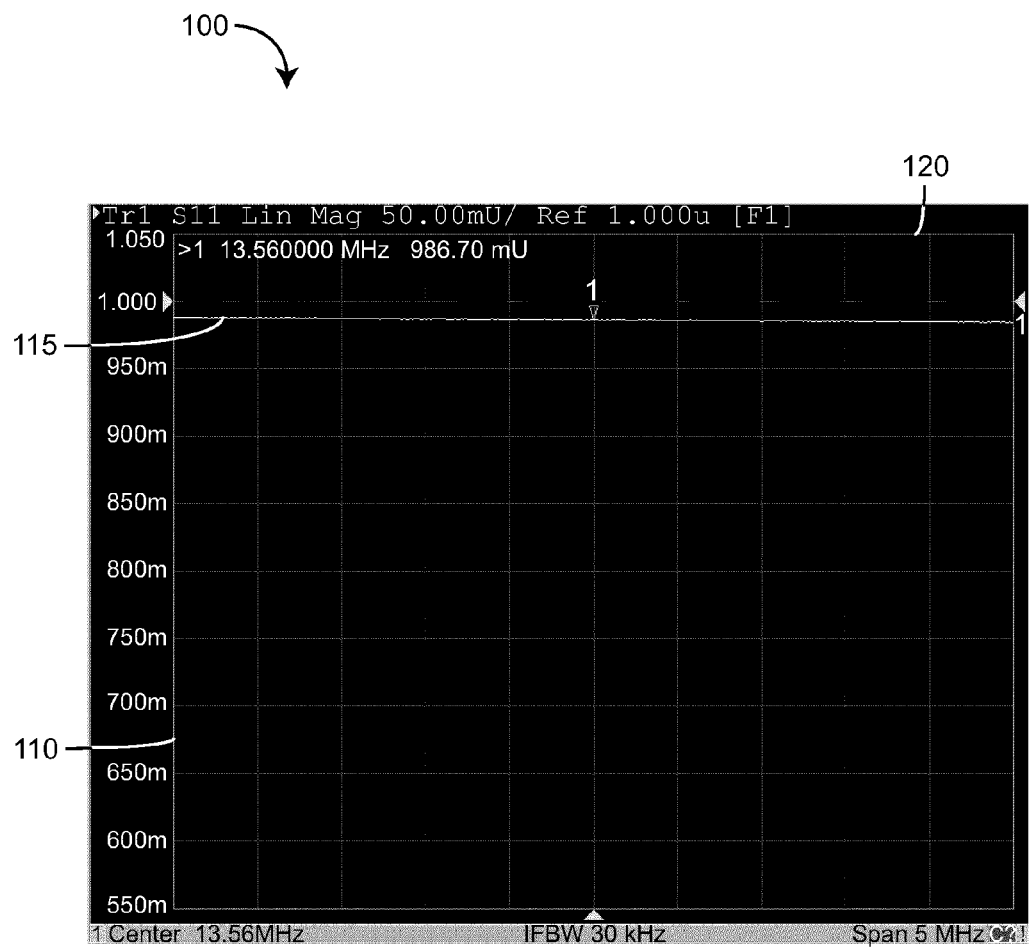
FIGS. 1 and 2 provide a brief illustration of a physical property that various embodiments utilize for operation.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, varying systems and methods for detecting when a wireless identification device such as an RFID tag/card has come within proximity of a detection system are shown and described. One way to detect when an RFID device has come within proximity of the detection system is to continuously keep the detection system in an active polling mode in which polling signals are periodically transmitted to RFID devices that may come near the detection system. Such systems require a continuous power requirement of several watts of power. These systems may be suitable for applications where power is not a substantial concern. For example, constant polling is often used by detection systems configured to control access to building and doors because these systems are typically connected to alternating current (AC) mains of the building. However, the use of continuous polling in mobile RFID detection systems or other types of RFID detection systems that utilize battery power rather than a hardwired power supply may cause the power supply to be drained quickly, requiring frequent recharging and/or battery replacement. Additionally, consumers of RFID systems may wish to utilize detection systems that are designed to reduce the power drawn by the detection circuit when not in active use to reduce cost even if the detection circuit is connected to a hardwired power source.

One way of reducing the power drawn by an RFID detection system is to enter the detection system into a low-power "sleep" mode when an RFID device is not within proximity of the detection system. Active communication with an RFID device, such as a Near Field Communication (NFC) device, typically requires a large amount of DC current (e.g., between 50 mA and 250 mA) at an operating voltage of 3 to 5 volts. Continuously operating a detection system at this current level would drain a typical detection system battery very quickly. In the low-power sleep mode, the detection system still uses power to detect whether a RFID device has entered the area, but the operating current is substantially lower than in the active communication mode (e.g., thousands of times less than the peak current required to communicate). In some embodiments, the target sleep current may be between approximately 1 µA and 25 µA, depending on the battery used. The sleep mode may be particularly useful for battery-powered applications, such as small battery-powered locks, lockout/tagout devices, hardwired detection systems with battery backup, and other applications.

Detections systems that incorporate a low-power sleep mode must include a mechanism for determining when to "wake" and enter an active mode to communicate with nearby RFID devices. In some implementations, detection systems may include user input devices, such as keypad buttons, that must be pressed to place the detection systems into an active communication mode.

In other implementations, detection systems may include a mechanism that senses when movement occurs on or near the detection system and may enter an active mode based on the sensed movement. For example, an accelerometer may be used to detect movement of the detection system, a capacitive touch device may be used to detect whether the detection system has been touched, and/or a passive infrared system may be used to detect when infrared light is emitted in the area around the detection system. Each of these example solutions would be subject to a significant number of false wakeup signals that would result in shortened battery life, particularly in an uncontrolled environment where the device is in frequent motion (e.g., a delivery truck or shipping container) or is likely to be approached and/or bumped frequently (e.g., a school locker).

Some implementations may include tuned circuits that are configured to detect the presence of an RFID device and wake the detection system out of sleep mode. Such detection systems may be less susceptible to certain types of false wakeup conditions, such as jostling in a delivery truck waking an accelerometer-based detection system. The tuned circuits of these detection systems may be configured to detect changes in voltage and/or current that may be caused by magnetic coupling of the tuned circuit to a tuned circuit in an RFID device that has come near the detection system. However, changes in voltage and/or current may also be caused by conditions other than an RFID device being placed near the detection system, such as a metallic object or a human hand being placed near the detection system. Accordingly, such tuned circuit detection systems are still susceptible to false wakeup conditions that can occur in variable environments and result in battery drain and widely variable battery life.

The system and methods provided herein are configured to provide RFID detection systems with improved power management by reducing the number of false wakeup signals resulting from objects other than the intended RFID devices. The exemplary embodiments provided herein are configured to trigger a wakeup of the detection systems based on observed electrical characteristics that are unique to the RFID devices that are intended to cause the wakeup condition and that are not caused by other objects such as metallic objects or human hands.

Some exemplary systems and methods provided herein are configured to sweep the operating frequency of an RF oscillator across a range of frequencies to detect whether a change in an electrical property is caused by an RFID device (a true wakeup condition) or a different object (a false wakeup condition). Some embodiments may be configured to determine a wakeup condition based on the amplitude and frequency content of signals generated at the detection system when an RFID device is nearby. An RF oscillator of the detection system may be configured to operate at a frequency at or near the center frequency of the tuned circuit included in RFID devices with which the detection system is configured to communicate. A sweep oscillator may be configured to oscillate the operating frequency of the detection system tuned circuit across a frequency range around the center operating frequency. If a RFID card is near the detection system, the tuned circuits of the RFID card and detection system will magnetically couple, and the RF voltage level in the detection system will decrease, only when the frequency is swept across the center frequency of the RFID card tuned circuit. If a different object, such as a metal object or a hand, is near the detection system, the RF level will be changed by approximately the same amount at all frequencies, and there will not be a substantial instantaneous change in amplitude at any particular frequency.

The sweep oscillator provides a sweep of signals having frequencies across a fixed band width at a sweep frequency. One complete cycle of the sweep causes the oscillator to pass through the center resonant frequency of the RFID device twice (to provide a signal at the center resonant frequency twice), such that the RF voltage level in the detection system tuned circuit changes twice for each cycle of the sweep. When the RFID device is near the detection system, an amplitude varying voltage signal with a modulated frequency equal to approximately twice the sweep frequency will be generated by the RF oscillator of the detection system. Accordingly, the detection system can detect the presence of an RFID device based on the presence of a signal having a frequency that is twice the sweep frequency. The magnitude of the signal is indicative of the relative distance between the detection system and the RFID device.

Some exemplary embodiments may be configured to determine a wakeup condition based on the amplitude of signals generated in the detection system when an RFID device is brought within proximity of the detection system. An RF oscillator of the detection system may be configured to operate at a frequency at or near the center frequency of the tuned circuit included in RFID devices with which the detection system is configured to communicate. A sweep oscillator may be configured to oscillate the operating frequency of the detection system tuned circuit across a frequency range around the center operating frequency. The sweep frequency may be a narrower band, such that a full sweep cycle causes the oscillator to reach the center resonant frequency of the RFID device once and the modulated frequency of the voltage signal generated in the detection system due to the RFID device is equal to the sweep frequency. The modulated voltage signal generated in the detection system may be demodulated and processed and the amplitude of the signal may be compared to a reference voltage to determine if the voltage level has changed enough to be due to an RFID device being present (as opposed to stray capacitance). If the amplitude of the signal is above a threshold amplitude, the detection system determines that an RFID device is present.

Any discrete oscillator circuit topology may be used to implement the RF oscillator. The point in the circuit at which the amplitude variation is sensed will vary based on the oscillator topology. The sweep frequency fm may be selected based on hardware settling times to provide a fast enough wakeup signal to meet the system specifications for sleep mode current drain. The host microprocessor may duty cycle the detection circuit to achieve a low sleep mode current drain.

Some exemplary embodiments may be configured to detect the presence of an RFID device using a DC voltage measurement in an oscillator circuit. An RF oscillator in the detection system may be locked to a particular crystal frequency that approximately corresponds to the tuned frequency of RFID devices with which the detection system is configured to communicate. Stray capacitance coupled to a sense antenna of the detection system lowers the resonant frequency of the antenna circuit away from its design frequency. Some embodiments may use this property to differentiate between stray capacitance and RFID devices by intentionally tuning the sense antenna circuit above the operating frequency of the oscillator. When stray capacitance causes the oscillator tank circuit, which includes the sense antenna, to be detuned, the resonant frequency moves down, closer to the operating frequency of the oscillator. This causes the DC voltage sensed in the detection system to increase. When a tuned circuit of an RFID device is brought near the detection system, the mutual inductance shared with the oscillator tank circuit results in RF energy being coupled to the RFID device. This causes the DC voltage sensed in the detection system to decrease. The detection system can determine whether a change in voltage is due to an RFID device or stray capacitance based on whether the voltage has increased or decreased.

The exemplary systems and methods disclosed herein may be utilized for any types of wireless identification and/or access control applications, such as RFID (e.g., NFC) applications. Such applications may include access control devices such as, but not limited to, an electronic padlock, an electronic door lock or keypad device (e.g., a keypad deadbolt), an electronic safe (e.g., a small document safe, a weapon storage safe, or an electronic keysafe), an electronic rim or mortise lock or other type of cabinet lock, an electronic auto accessory lock (e.g., a coupler lock, a hitch pin lock, a trailer lock, etc.) and/or a steering wheel or door lock for an automobile, a vehicle lock (e.g., a wheel lock or ignition lock) for other motorized or non-motorized vehicles such as a bicycle, a motorcycle, a scooter, an ATV, and/or a snowmobile, a storage chest, a case with an electronic lock (e.g., a document case or a case for small valuables), an electronic cable lock (e.g., a cable lock enabled with an alarm, such as for securing a computing device), a safety lockout/tagout device for securing access for safety purposes (e.g., for securing an electrical control box while electrical work is being performed), a locker with an electronic lock, and/or an electronic luggage lock.

Figure 2:
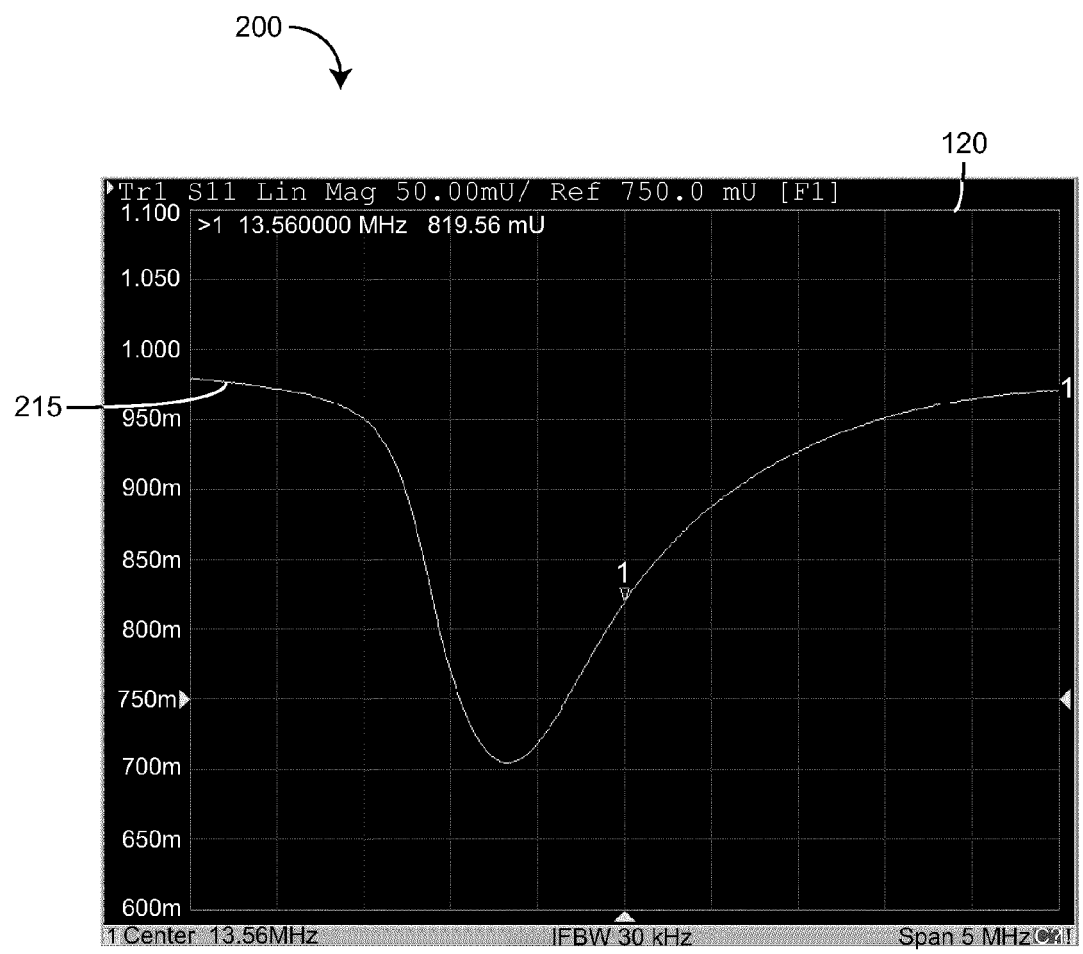

FIGS. 1 and 2 provide a brief illustration of a physical property that various embodiments utilize for operation. FIG. 1 is a graph illustrating the magnitude of a signal at a network analyzer (e.g., coupled to a untuned magnetic field probe) without an RFID card present. FIG. 2 is a graph illustrating the magnitude of a signal at the network analyzer after an RFID card comes within proximity of the magnetic field probe. The principle illustrated in the simulation graphs of FIGS. 1 and 2 is representative of a voltage change evaluated by some embodiments subsequently described. Referring generally to FIGS. 1 and 2, graphs are provided that illustrate the effects of introducing an RFID (e.g., NFC) device (e.g., an RFID card) near a magnetic field probe. FIG. 1 shows a graph 100 illustrating the magnitude of a signal at a network analyzer without an RFID device present. Graph 100 was generated using a test setup that included an S11 network analyzer and a magnetic field probe. The magnetic field probe is a loop of wire connecting the center conductor to the shield (ground) of the test cable and has a diameter of approximately 1 inch. Graph 100 includes an x-axis 105 that represents a range of frequencies with a center frequency 120 set at 13.56 MHz and a displayed range around the center frequency of +/−2.5 MHz. A y-axis 110 represents a magnitude of the signal being reflected back into a port of the network analyzer.

Graph 100 includes a trace signal 115 that represents the magnitude of the RF energy generated by the network analyzer that is reflected back into the port of the network analyzer when an RFID card is not present. Signal 115 is relatively flat, or constant across the displayed range of frequencies and has a magnitude slightly less than 1.000. A magnitude of 1.000 indicates that all of the RF energy generated by the network analyzer is being reflected back into the port of the network analyzer. Because the magnetic field probe is a short to ground, all of the energy generated by the network analyzer, less the power lost in the connectors and cable, is reflected back into the port. The impedance of the network analyzer port is 50 ohms. If the short to ground were replaced with a perfect 50 ohm load, the impedance of the load would perfectly match the port impedance, all of the energy would be transferred to the load, and the trace would indicate a magnitude of 0.000.

FIG. 2 shows a graph 200 illustrating the magnitude of the signal at the network analyzer after an RFID device is brought within proximity of the magnetic field probe. Graph 200 illustrates a trace signal 215 with a magnitude response that dips at a frequency that is very close to the operating frequency of the RFID system, the center frequency 120 of 13.56 MHz. The dip indicates that the RFID card is acting as a load and absorbing energy. On either side of the minimum point of signal 215, a slope can be seen that indicates a varying change in energy absorbed with respect to frequency. Various exemplary embodiments are provided below that utilize the electrical behavior of tuned circuits illustrated in FIGS. 1 and 2 to detect when an RFID device has entered the area near an RFID detection system.

Figure 3A:
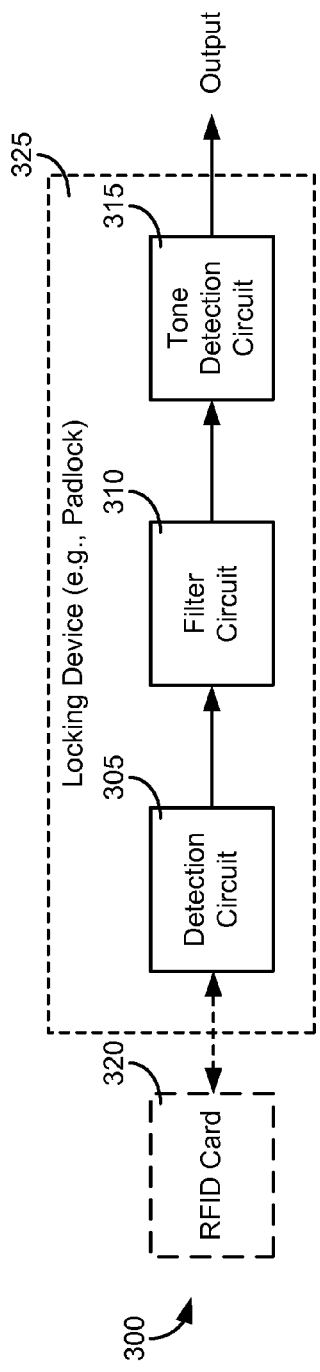
FIG. 3A is a block diagram of an RFID detection system, according to an exemplary embodiment.

Referring now to FIG. 3A, a block diagram of an RFID detection system 300 is shown according to an exemplary embodiment. System 300 is configured to sweep the operating frequency of an RF oscillator across a range of frequencies to detect whether a change in an electrical property is caused by an RFID device (a true wakeup condition) or a different object (a false wakeup condition).

When an RF oscillator that utilizes a tuned circuit such as a lumped element tank circuit as part of its topology and runs at a frequency fc is allowed to radiate and is brought into close proximity with another tuned circuit (e.g., a tuned circuit of an RFID card or NFC device), a small amount of RF energy that is generated by the oscillator will be coupled into the second tuned circuit in one embodiment. The RF voltage level in the RF oscillator circuit at or near the center frequency fc will change (e.g., decrease) because some energy is coupled magnetically into the second tuned circuit in one embodiment. This property is illustrated in graph 200 of FIG. 2. The amount of RF energy that is coupled from the oscillator circuit into the second resonant circuit is proportional to the distance between the RF oscillator and the second tuned circuit.

An RFID card or NFC device includes a tuned circuit centered at the operating frequency of the RFID system in one embodiment. The coupling of an RFID device such as RFID card 320 can be used by system 300 to detect when RFID card 320 has come within the proximity of system 300. However, as discussed above, the RF voltage level at center frequency fc, as well as other frequencies, will also change if a metallic object or hand is brought in close proximity to the oscillator tank circuit of system 300, because the metallic object or hand will change the loading on the tank circuit.

To reduce false wakeups associated with sources of stray capacitance, such as metallic objects or hands, system 300 is configured to use the frequency characteristics of the electrical response in the tuned tank circuit of system 300 to determine whether to wake from a sleep mode into an active mode in one embodiment. System 300 includes a detection circuit 305 that includes a tuned oscillating circuit with a center frequency fc. Detection circuit 305 is configured to sweep (e.g., continuously) across a bandwidth of frequencies that include the resonant frequency fc. In some embodiments, a voltage controlled oscillator (VCO) may be used as a sweep oscillator to sweep the frequency range. The frequency of the sweep oscillator is dependent on the control voltage. When an RFID device (e.g., RFID card 320) is present in the area near system 300, the oscillator amplitude will change only when the oscillator frequency is swept through the resonant frequency fc of the RFID system. Sources of stray capacitance, such as metallic objects, that are in close proximity to system 300 will change the oscillator amplitude nearly equally at all frequencies swept by the oscillator. If the object magnetically coupled to system 300 is a stray capacitance source, as the oscillator is swept over the range of frequencies, there will be little or no instantaneous change in amplitude at any particular frequency or range of frequencies.

Detection circuit 305 is configured to sweep across the bandwidth with a fixed frequency fm. The bandwidth swept by detection circuit 305 may be set to be wide enough to completely pass through frequencies associated with a voltage dip in the oscillator near the resonant frequency when sweeping in each direction. In the exemplary graph 200 shown in FIG. 2, for example, detection circuit 305 would sweep across a wide enough range of frequencies in both directions that the dip in trace signal 215 would be passed through twice by detection circuit 305. The bandwidth may be set to be wide enough to account for device-to-device variation in center resonant frequency in one embodiment. In some embodiments, the bandwidth may be set to approximately +/−10+ of the resonant frequency (e.g., 1.356 MHz for an RFID system with a resonant frequency of 13.56 MHz).

When an RFID device is present near system 300, the RF oscillator amplitude sensed in detection circuit 305 will change twice for each frequency sweep cycle. The amplitude varying RF voltage signal generated in the oscillator circuit of detection circuit 305 will have a modulated frequency that is twice the sweep frequency fm of detection circuit 305, because the amplitude dip will occur twice for each sweep cycle in one embodiment. The presence of a voltage signal in the oscillator circuit having a frequency of twice the sweep frequency (2 fm) indicates the presence of an RFID device in close proximity to system 300 in one embodiment. The magnitude of the signal indicates the relative distance between the RFID device and system 300 in one embodiment.

As the frequencies are swept by detection circuit 305, the resultant RF modulated voltage signal is demodulated and passed to a filter circuit 310 in one embodiment. Filter circuit 310 is configured to process the demodulated voltage signal to pass through a signal having a frequency of 2 fm and to filter out signals at other frequencies. Filter circuit 310 is configured to remove noise that may be present in the voltage signal as well as other signals that are not of interest in detecting the presence of an RFID device (e.g., signals having frequencies other than 2 fm) in one embodiment. In some embodiments, filter circuit 310 may include one or more notch filters configured to remove components of the voltage signal having particular frequencies, such as components having a frequency of fm or 3 fm. Removing such components may make it easier to detect the signals of interest having the frequency of 2 fm.

Filter circuit 310 is configured to pass the processed voltage signal to a tone detection circuit 315. Tone detection circuit 315 is configured to receive the filtered voltage signal and to determine if a component having a frequency equal to approximately 2 fm is present within the signal. Tone detection circuit 315 is configured to provide a first output (e.g., a high output) when the 2 fm signal is not present and a second output (e.g., a low output) when the 2 fm signal is present. The output may be provided to a processor (e.g., a microcontroller, digital signal processor, ASIC, etc.) or a different type of analog or digital circuit (e.g., a comparator) that is configured to determine whether an RFID device is present in the area of system 300 based on the state of the output of tone detection circuit 315. If an RFID device is determined to be present, the processor or other circuit is configured to trigger a wakeup condition and move system 300 from the low-power sleep state into an active communication state to communicate with the RFID device.

Figure 3B:
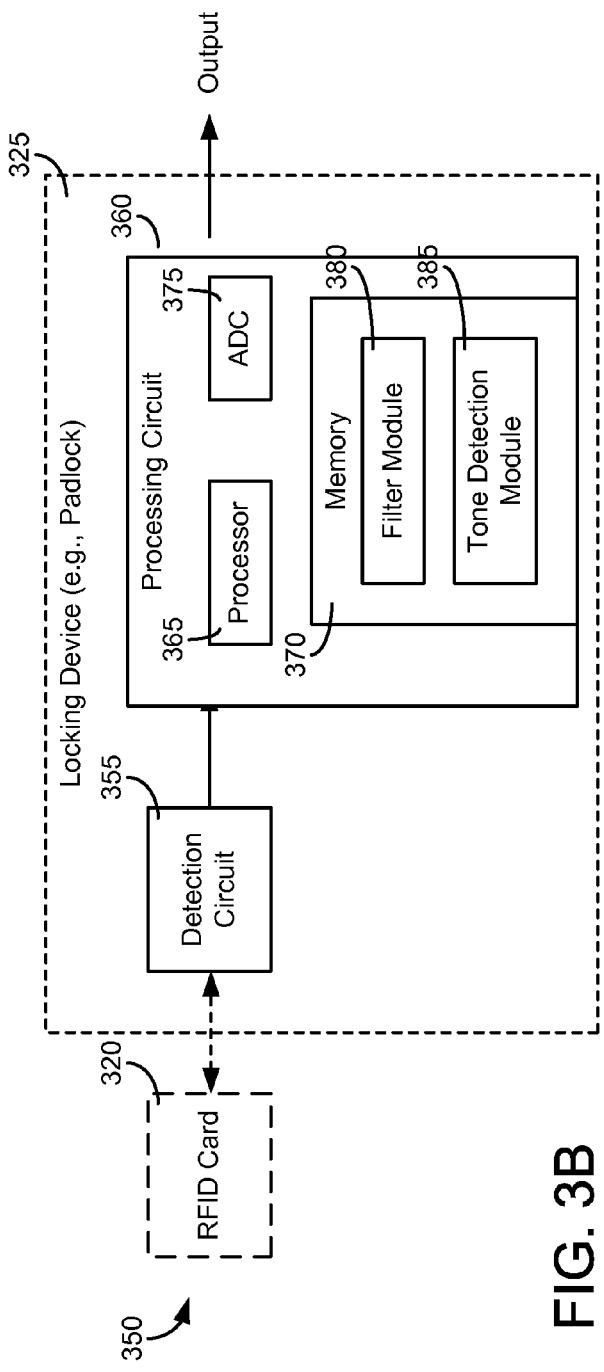
FIG. 3B is a block diagram of an RFID detection system, according to another exemplary embodiment.

FIG. 3B illustrates a block diagram of another RFID detection system 350 according to another exemplary embodiment. In some embodiments, one or more functions of the detection system may be performed using a microprocessor rather than using analog circuitry. System 350 performs the same functions that are performed by system 300, including frequency sweeping and oscillator voltage detection using a detection circuit 355. System 350 utilizes a processing circuit 360 (e.g., a digital microprocessor) to perform the filtering and tone detection functions that are performed by analog circuitry in system 300. Processing circuit 360 includes a processor 365, which may be any type of general purpose or special purpose microprocessor (e.g., FPGA, CPLD, ASIC, etc.). Processing circuit 360 also includes a memory 370, which may include any type of computer- or machine-readable storage medium (e.g., RAM, ROM, EEPROM, flash memory, etc.). Processing circuit 360 may include an analog-to-digital controller (ADC) circuit 375 configured to receive the analog voltage signal from detection circuit 355 and to convert the analog voltage signal into a digital signal that can be interpreted and manipulated by processing circuit 360.

Memory 370 may include modules including instructions that, when executed by processor 365, cause processor 365 to perform functions that may be used in detecting the presence of an RFID device. A filter module 380 may be configured to receive the digital representation of the voltage signal from ADC circuit 375 and to filter out components of the signal that correspond to frequencies other than twice the sweep frequency used in detection circuit 355 (2 fm), passing through the component of the signal with a frequency of 2 fm. A tone detection module 385 is configured to perform tone detection on the filtered signal to detect whether a signal having a frequency of approximately 2 fm is present in the filtered signal. If a signal having a frequency of 2 fm is present, tone detection module 385 may determine that an RFID device is present in the area of system 350, and processing circuit 360 may switch system 350 from a sleep mode into an active communication mode. The RFID detection system 300 and 350 may be configured to be embedded within a locking device 325 (e.g., a padlock).

Different applications may benefit from performing more or less functions of the detection system in analog circuitry or in a digital processor. For example, performing more functions in a digital processor may require a higher power or more complex digital processor to be included in the detection system. Analog circuitry may be relatively inexpensive and may be used to reduce costs of the detection system for low-cost applications (e.g., such that a less complex, lower power processor, or no processor at all, may be used). Centralizing multiple functions within a microprocessor may reduce the space needed for the processing components of the detection system and may allow the detection system to be included in a smaller housing. Some implementations may already require a processor that has a higher level of processing power, so that utilizing separate analog circuitry to perform some of the functions of the detection system may be unnecessary. Accordingly, different combinations of analog and/or digital circuitry may be most suitable for different applications.

Figure 4A:
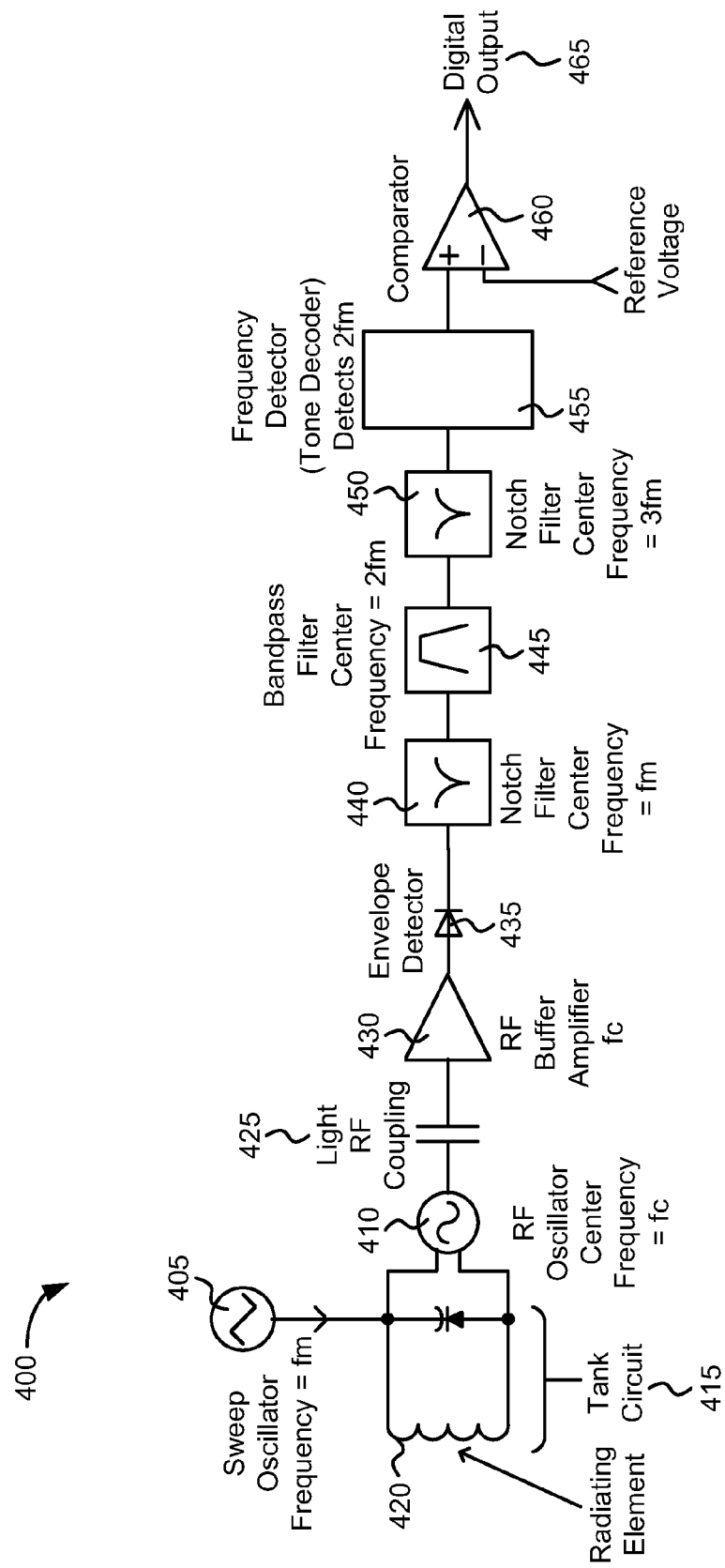
FIG. 4A is a detailed block diagram of an RFID detection system, according to an exemplary embodiment.

Referring now to FIG. 4A, a more detailed block diagram of an RFID detection system 400 is shown according to an exemplary embodiment. System 400 is a more detailed implementation of system 300 shown in FIG. 3A, according to one exemplary embodiment.

System 400 includes an RF oscillator 410 that is coupled to a lumped element tank circuit 415 and operates at a center frequency fc that is the designed resonant frequency of the RFID system. A radiating element 420 (e.g., an antenna) is used to communicatively couple system 400 to RFID devices near system 400.

System 400 includes a sweep oscillator 405 configured to sweep RF oscillator 410 across a range of frequencies around the center frequency fc of RF oscillator 410. The RF modulated voltage response is passed from RF oscillator 410 through light RF coupling via a coupling capacitor 425 to an RF buffer amplifier configured to provide isolation between the RF oscillator 410 outputs and the later processing circuitry of system 400 to protect against the other circuitry disturbing the performance of oscillator 410.

The buffered voltage signal is then passed to an envelope detector 435 configured to demodulate the RF modulated voltage signal and provide the envelope of the modulated voltage signal as an output. The envelope of the signal is a direct current (DC) signal that is generated based on the amplitude of the RF modulated signal. The output of envelope detector 435 is a demodulated baseband signal based on the original RF modulated signal in one embodiment.

The demodulated signal is then passed to a series of filters configured to pass through signal components having a frequency of approximately twice the sweep frequency of sweep oscillator 405 (2 fm) and to filter out noise and other unwanted components of the voltage signal. A first notch filter 440 may be configured to filter out voltage signal components having a frequency approximately equal to the sweep frequency fm of sweep oscillator 405 in one embodiment. In some embodiments, a second notch filter 450 may be provided to filter out voltage signal components having a frequency approximately equal to three times the sweep frequency of sweep oscillator 405 (3 fm). Notch filters 440 and 450 may help reduce harmonics in the signal that may interfere with proper detection of the desired 2 fm signal components. Signal components having a different frequency than the target frequencies of notch filters 440 and 450 (fm and 3 fm, respectively) are passed through by notch filters 440 and 450. A bandpass filter 445 is configured to pass through signal components having frequencies at or near 2 fm and to block or attenuate signal components having other frequencies.

The filtered signal is then provided to a frequency detector 455 (e.g., a tone detector) configured to determine if a component having a frequency equal to approximately 2 fm is present within the signal. Frequency detector 455 is configured to provide a first output (e.g., a high output) when the 2 fm signal is not present and a second output (e.g., a low output) when the 2 fm signal is present. The output is provided to a comparator 460 that compares the output of frequency detector 455 to a reference voltage level configured to differentiate between high and low output levels of frequency detector 455. Comparator 460 generates a digital output based on the voltage comparison that represents whether the frequency detector is in a state that indicates that a signal component having a frequency of approximately 2 fm has been detected, indicating the presence of an RFID device near system 400. The output may be provided to a microcontroller configured to wake system 400 from a sleep mode into an active communication mode if the output indicates the 2 fm frequency signal component to be present.

Figure 4B:
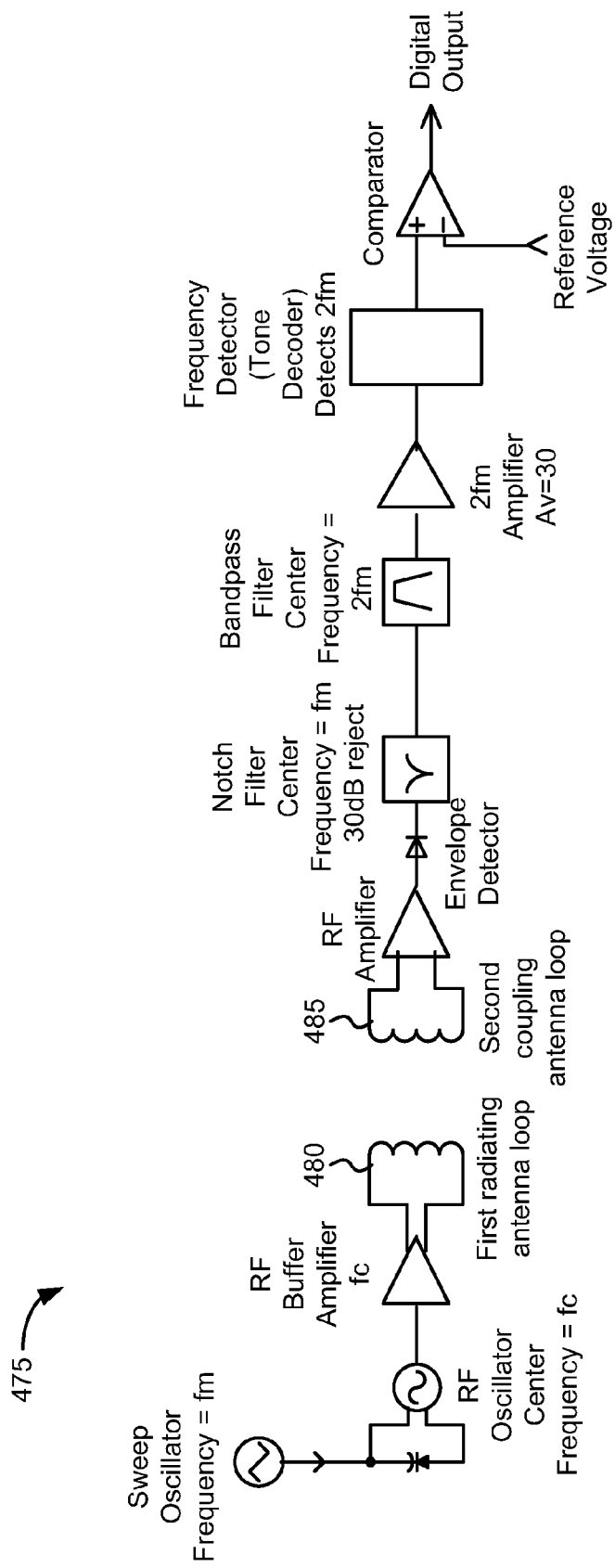
FIG. 4B is a detailed block diagram of an RFID detection system, according to another exemplary embodiment.

FIG. 4B illustrates another exemplary embodiment of an RFID detection system 475. Many of the components of system 475 function in a similar manner as described above with respect to system 400. Instead of the RF oscillator being loosely coupled to the RF buffer amplifier using a capacitor, the capacitor is replaced by a first radiating antenna loop 480 and a second coupling antenna loop 485. Loop 480 is loosely coupled to loop 485, which is connected to the RF amplifier, envelope detector, filtering components, etc.

Figure 5A:
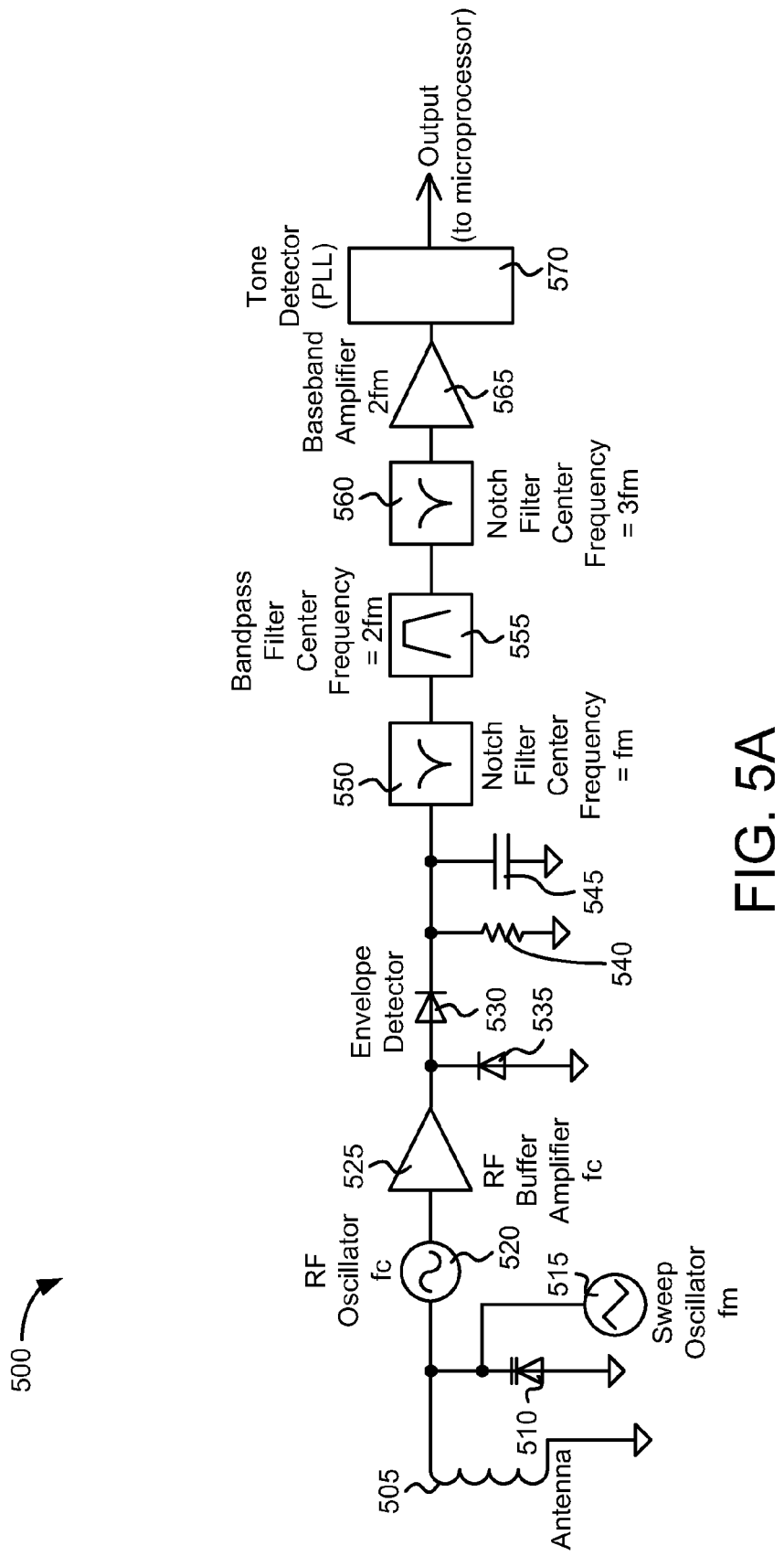
FIG. 5A is a detailed block diagram of an RFID detection system, according to another exemplary embodiment.

Referring now to FIG. 5A, another detailed block diagram of an RFID detection system 500 is shown according to an exemplary embodiment. System 500 is a more detailed implementation of system 400 shown in FIG. 4A according to one exemplary embodiment. System 500 includes many of the same components included in system 400.

System 500 also includes a varactor diode 510 that is used to adjust the tuning of the RF oscillator 520 circuit. Varactor diodes are variable capacitance elements whose capacitance varies as a function of the voltage applied across the terminals of the varactor diode. The output of a sweep oscillator 515 is applied to varactor diode 510 to change the capacitance of varactor diode 510 and to sweep the tuned operating frequency of RF oscillator 520 across the range of frequencies provided during the sweep.

System 500 includes a detailed exemplary implementation of the envelope detector configured to demodulate the voltage signal. The envelope detector of system 500 includes a first diode 530 and a second diode 535 configured to rectify the input signal at the envelope detector. Diodes 530 and 535 implement a full wave rectifier. The input to the envelope detector is alternating current having both positive and negative swings. During the positive swings, diode 530 will allow current flow when the input voltage is higher than the voltage across a capacitor 545 of the envelope detector. During the negative swings, diode 535 conducts current and the current that passes through diode 535 will contribute to the total output voltage of the envelope detector in one embodiment. In some embodiments, diode 530 may be a Schottky diode. In some embodiments, envelope detector may be configured to include a half wave rectifier including only diode 530 and not diode 535.

System 500 includes notch filters and a bandpass filter similar to those included in system 400. System 500 also includes a baseband amplifier 565 configured to amplify the signal components having a frequency of approximately twice the sweep frequency (2 fm) after those components have been passed through the bandpass filter 555. The amplified components are then provided to a tone detector 570 that is configured to detect whether substantial components of the signal having a frequency of approximately 2 fm are present in the signal. In some embodiments, tone detector 570 may include a phase locked loop (PLL).

Figure 5B:
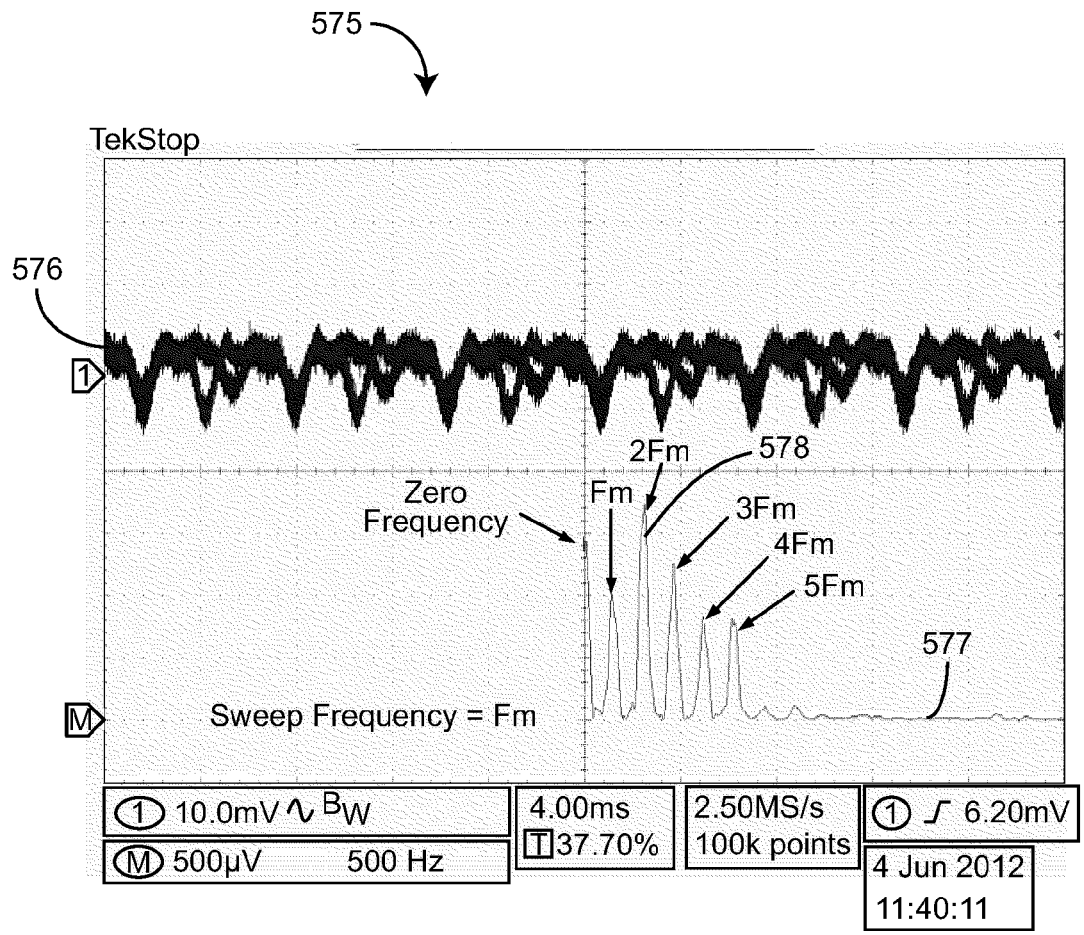
FIG. 5B is a graph illustrating the output of an RFID detection system when an RFID device is not present, according to an exemplary embodiment.
Figure 5C:
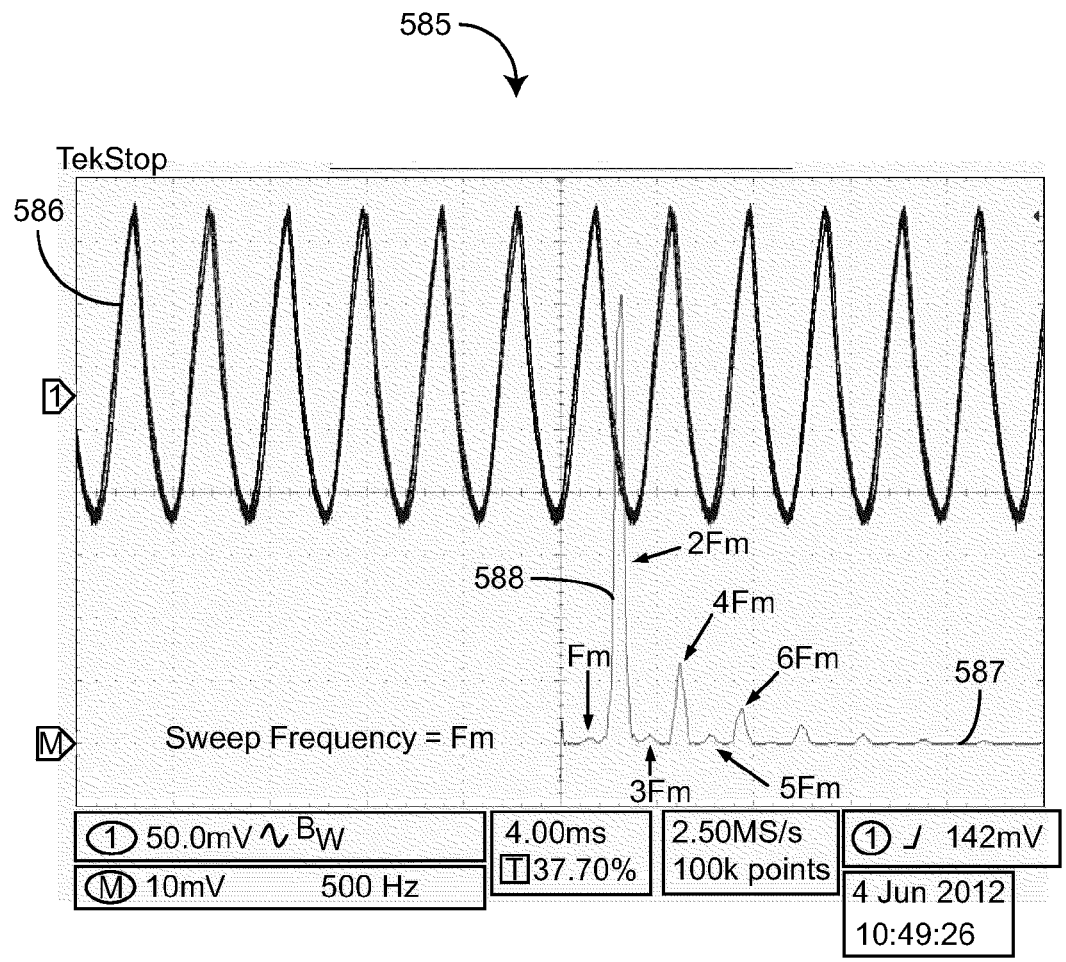
FIG. 5C is a graph illustrating the output of the same RFID detection system as in FIG. 5B when an RFID device is present, according to an exemplary embodiment.

FIGS. 5B and 5C provide graphs that illustrate an output signal of an RFID detection system such as system 500 according to exemplary embodiments. FIG. 5B includes a graph 575 that illustrates an output signal 576 of a signal filter for an RFID detection system when an RFID device is not present in the area near the detection system. Signal 576 includes a residual noise signal at the sweep frequency fm and at the harmonics of the sweep frequency fm. A frequency content plot 577 illustrated in FIG. 5B represents a fast Fourier transform (FFT) of signal 576 and illustrates the frequency content of signal 576. Frequency content plot 577 illustrates that the components of signal 576 having frequencies of fm and the harmonics thereof have moderately increased amplitudes. The amplitude of the signal 576 component at a frequency of 2 fm (ref no. 578) is comparable to the amplitude of the signal 576 components at other harmonics of fm.

FIG. 5C includes a graph 585 that illustrates an output signal 586 for the signal filter of the same RFID detection system as FIG. 5B when an RFID device is present in the area near the detection system. Signal 586 includes a well defined signal at a frequency of twice the sweep frequency, 2 fm, when the RFID device is present. A frequency content plot 587 represents a FFT of signal 586 and illustrates the components of signal 586 at various frequencies. As can be seen in frequency content plot 587, the amplitude of the signal 586 component at a frequency of 2 fm (ref no. 588) is substantially larger than the amplitude of the corresponding signal component of signal 576. This larger amplitude is due to a substantial instantaneous change or dip in voltage at the 2 fm frequency due to the coupling of the tuned circuits of the RFID device and RFID detection circuit. There are also smaller but noticeable signal components at the harmonics of frequency 2 fm (e.g., 4 fm and 6 fm). The signal components corresponding to other frequencies, such as fm, 3 fm, and 5 fm, are largely removed in signal 586. The presence of a substantial signal 586 component at a frequency of 2 fm indicates to the RFID detection circuit the presence of an RFID device.

Figure 6:
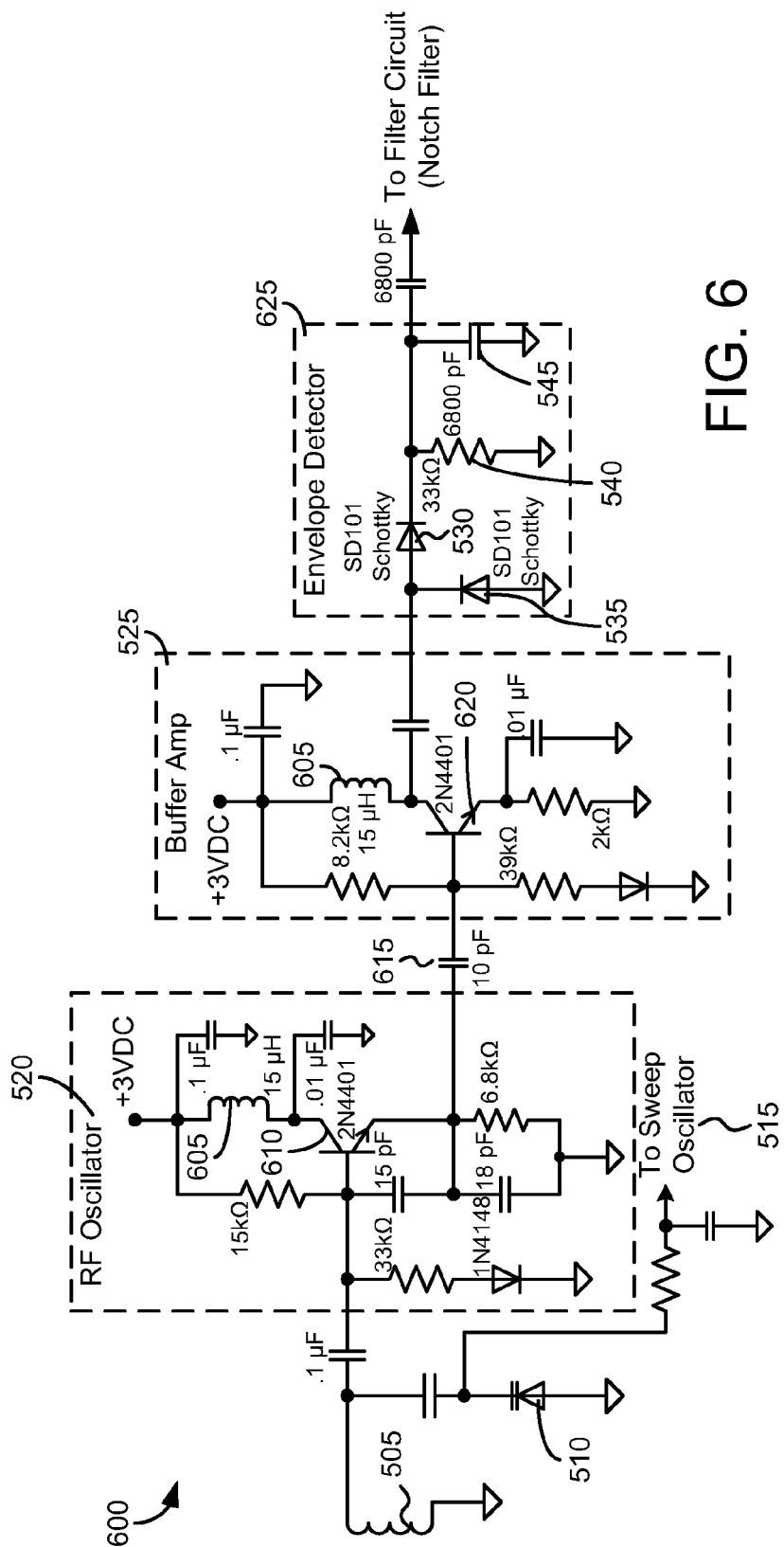
FIG. 6 is a circuit diagram of a circuit corresponding to the block diagram of FIG. 5A, according to an exemplary embodiment.

Referring now to FIG. 6, a circuit diagram of a circuit 600 corresponding to a portion of the components of system 500 is shown according to an exemplary embodiment. Circuit 600 includes an RF oscillator 520 and associated tank circuit that, in the illustrated embodiment, is tuned to a center operating frequency fc of 13.56 MHz. In the illustrated embodiment, RF oscillator 520 includes a BJT transistor 610 and an RF choke 605 configured to block RF components of signals propagating through RF oscillator 520 while passing direct current signals. The operating frequency of RF oscillator 520 is swept across a bandwidth around the center operating frequency fc of 13.56 MHz using sweep oscillator 515 and varactor diode 510.

The voltage at the emitter of transistor 610 is passed through a coupling capacitor 615 to RF buffer amplifier 525. In the illustrated embodiment, RF buffer amplifier 525 also includes an RF choke 605 and a BJT transistor 620. The voltage signal at the collector of transistor 620 is passed to envelope detector 625, which demodulates the voltage signal. The demodulated signal is then passed forward for filtering and tone detection to ultimately be used in detecting the presence or absence of an RFID device near circuit 600 as described in detail above.

In various embodiments, various features of the RFID detection system may be realized using analog circuits, microprocessors with firmware programming and digital signal processing techniques, or both. For example, in some embodiments, the filters may be implemented using analog circuitry and the tone detection may be implemented in microprocessor firmware using digital signal processing techniques. In other embodiments, both the filters and tone detection may be implemented using analog circuitry. The microprocessor selected for use in the RFID detection circuit may be dependent upon the features implemented within the microprocessor. In some embodiments, the sweep frequency may be generated using the host microprocessor or analog circuitry. While embodiments above have been discussed with respect to a center operating or resonant frequency of 13.56 MHz, other non-RF or low frequencies (e.g., 60 kHz-150 kHz) or high frequencies (e.g., 27.12 MHz) may be used as the resonant frequency for the RFID system.

In some embodiments, the presence or absence of an RFID device in the area around an RFID detection system may be determined based on the magnitude of the changed amplitude in the oscillator circuit. An RF oscillator of the detection system may be configured to operate at a frequency at or near the center frequency of the tuned circuit included in RFID devices with which the detection system is configured to communicate. A sweep oscillator may be configured to oscillate the operating frequency of the detection system tuned circuit across a frequency range around the center operating frequency. The sweep frequency may be a narrower band, such that a full sweep cycle causes the oscillator to reach the center resonant frequency of the RFID device once and the modulated frequency of the voltage signal generated in the detection system due to the RFID device is equal to the sweep frequency. The modulated voltage signal generated in the detection system may be demodulated and processed and the amplitude of the signal may be compared to a reference voltage to determine if the amplitude level has changed enough to be due to an RFID device being present (as opposed to stray capacitance). A larger amplitude of the detected signal corresponds to a larger instantaneous dip in the monitored voltage signal in the detection circuit. If the amplitude is greater than a threshold amplitude, the detection system determines that an RFID device is present.

Figure 7A:
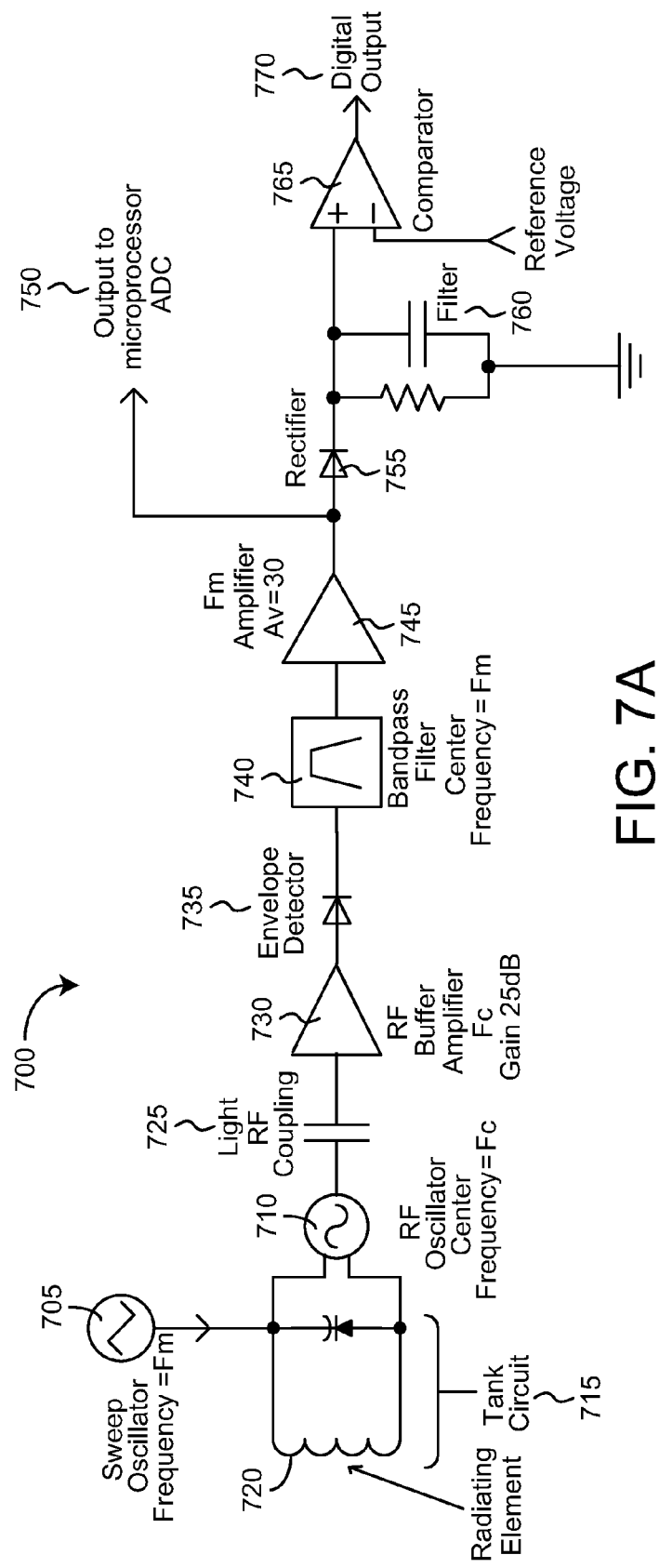
FIG. 7A is a block diagram of another RFID detection system, according to another exemplary embodiment.

FIG. 7A illustrates a block diagram of an RFID detection system 700 that is configured to detect the presence of an RFID device based on the magnitude of the changed amplitude in an oscillator circuit. System 700 includes many elements that are similar to those found in systems 400 and 500, including a sweep oscillator 705, an RF oscillator 710 coupled to a tank circuit 715, and a radiating element 720 configured to communicate with RFID devices near system 700. RF oscillator 710 operates at a center resonant frequency fc. RF oscillator 710 may be very low power and may be either free running near the operating frequency of the RFID system or phase (frequency) locked to the center of the operating frequency of the RFID system (e.g., by an analog frequency discriminator or an analog or digital phase locked loop (PLL)).

As in system 400, sweep oscillator 705 is configured to cause RF oscillator 710 to sweep across a range of frequencies around the center resonant frequency fc. Sweep oscillator 705 may have a sweep frequency fm that is narrower than sweep oscillator 405 of system 400. In some embodiments, sweep oscillator 705 may have a sweep frequency fm that is 0.1% to 1% of the center frequency fc of RF oscillator 710 (e.g., 13.56 kHz to 135.6 kHz for a center frequency of 13.56 MHz). In some embodiments, the sweep frequency fm may be in the range of 100 Hz to 100 kHz. The sweep frequency fm may be set to be wide enough to account for device-to-device variation in the center frequency of RFID devices with which system 700 is configured to communicate.

Ordinarily, when RF oscillator 710 is swept in frequency by sweep oscillator 705, the amplitude of the voltage response at RF oscillator 710 remains relatively constant. When sweep oscillator 705 sweeps across the sweep frequency fm and an RFID device is present, the amplitude of the voltage response at RF oscillator 710 varies in a manner similar to that shown in graph 200 as the RFID device is absorbing some energy from RF oscillator 710. Because the sweep frequency fm is set to a more narrow band, a full sweep cycle causes RF oscillator 710 to reach the center resonant frequency fc of the RFID device once rather than passing completely through the resonant frequency range twice over the sweep cycle as in system 400. Accordingly, the frequency of the modulated voltage signal generated at RF oscillator 710 will be the same as the sweep frequency fm. The modulated voltage signal is passed through an RF buffer amplifier 730 and demodulated using an envelope detector 735 in a manner similar to that described with respect to system 400. In some embodiments, RF buffer amplifier 730 may have a gain of approximately 25 dB. The demodulated signal is passed through a bandpass filter 740 with a pass band around sweep frequency fm to isolate the desired RFID device-induced signal from noise. The signal component having the frequency of approximately fm is amplified by an amplifier 745.

The magnitude of the output voltage signal may be used to determine whether an RFID device is present in the area near system 700. If an RFID device is present, an amplitude change is generated due to the magnetic coupling of the tuned circuit inside the RFID device with system 700. Stray capacitance due to hands or conductive objects cannot produce a changing oscillator amplitude with respect to frequency. Additionally, stray capacitance will not produce an amplitude of demodulated signal at the fm frequency that the presence of an RFID device will cause. The presence of an RFID device can be detected by comparing the amplitude of the output signal with a reference voltage. If the amplitude of the output signal is above the reference magnitude, indicating a substantial instantaneous change or dip in the voltage at the fm frequency, it is determined that an RFID device is present in the area near system 700 in one embodiment. In some embodiments, the output signal may be provided directly to a microprocessor (e.g., through an ADC circuit) to perform the comparison and trigger a wakeup condition when appropriate. In some embodiments, the output signal may be averaged using a rectifier 755 and filter 760 may be applied to a comparator 765 configured to perform the comparison with a reference voltage and output a digital output 770 used to control the wakeup condition.

Figure 7B:
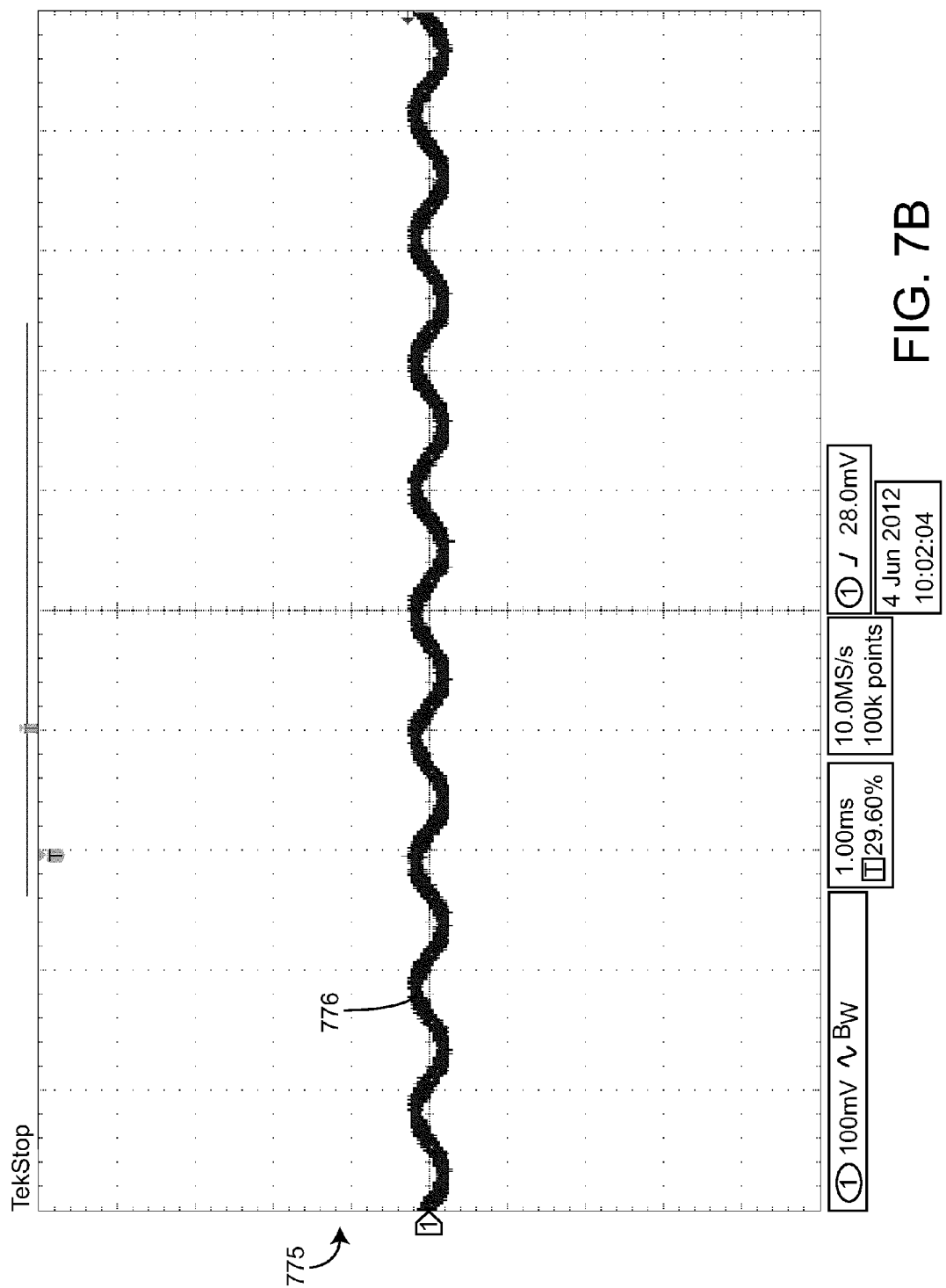
FIG. 7B is a graph illustrating the output of an RFID detection system when an RFID device is not present, according to an exemplary embodiment.
Figure 7C:
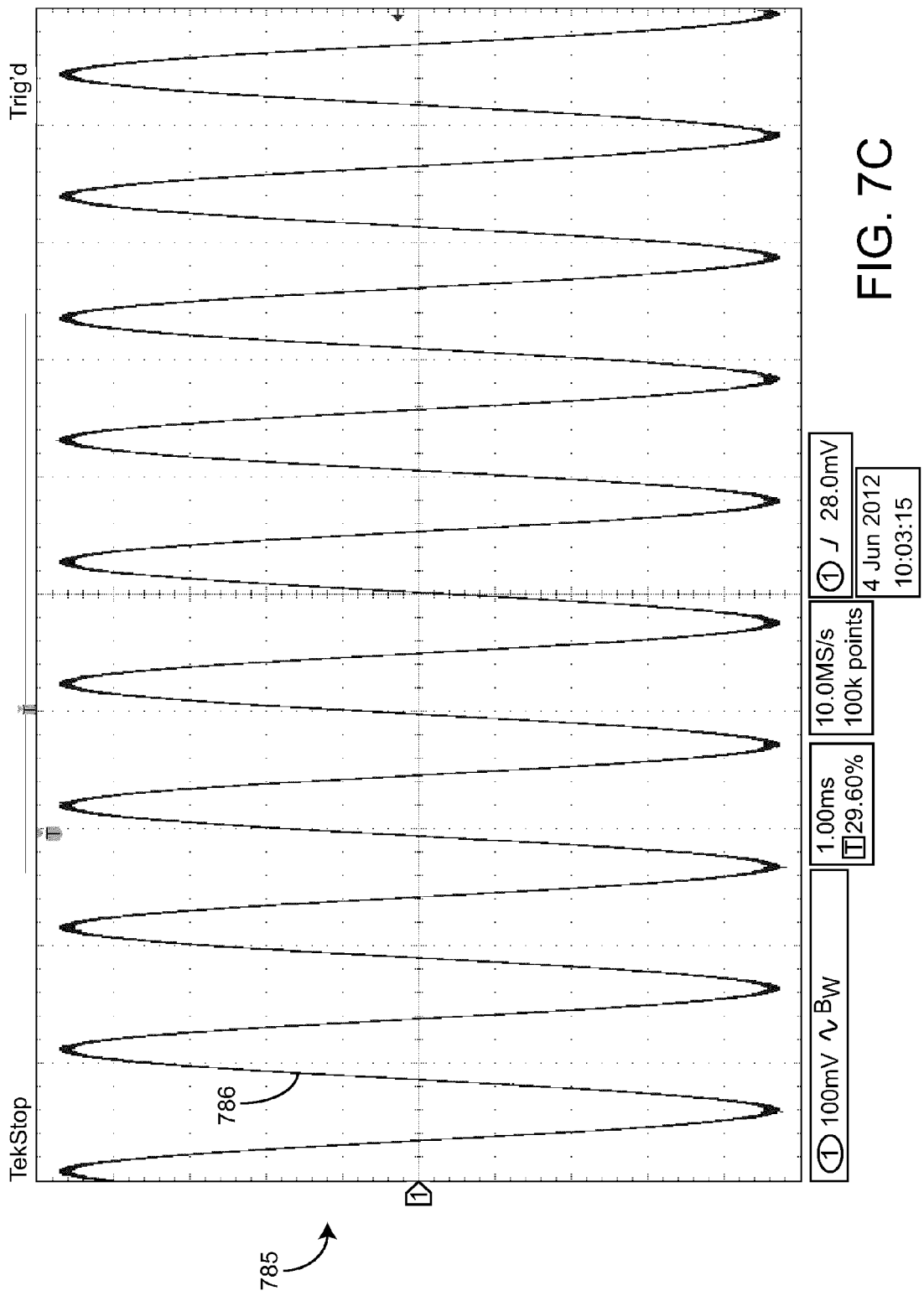
FIG. 7C is a graph illustrating the output of the same RFID detection system as in FIG. 7B when an RFID device is present, according to an exemplary embodiment.

FIGS. 7B and 7C provide graphs that illustrate an output signal of an RFID detection system such as system 700 according to exemplary embodiments. FIG. 7B includes a graph 775 that illustrates an output signal 776 of a signal filter for an RFID detection system when an RFID device is not present in the area near the detection system. Signal 776 includes residual noise at the sweep frequency fm and has a relatively small amplitude.

FIG. 7C includes a graph 785 that illustrates an output signal 786 for the signal filter of the same RFID detection system as FIG. 7B when an RFID device is present in the area near the detection system. The signal 786 component at the sweep frequency fm has a substantially larger amplitude as compared to the corresponding component of signal 776. This is due to the instantaneous voltage change that occurs at frequency fm due to the coupling of the tuned circuits of the RFID device and RFID detection circuit. The RFID detection system may determine that the amplitude of the signal 786 component at the sweep frequency fm exceeds a threshold voltage level and may initiate a wakeup condition.

Figure 8:
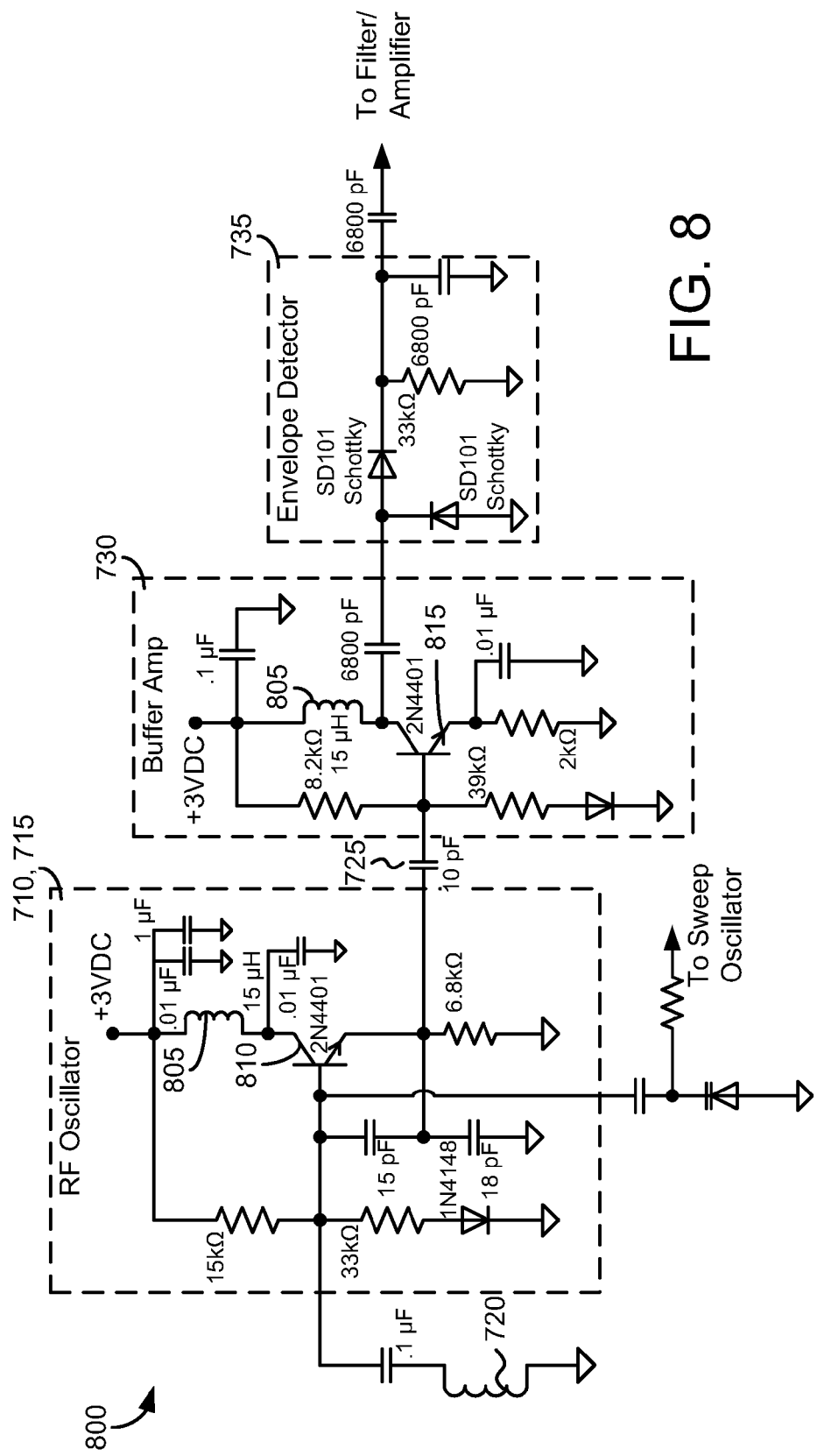
FIG. 8 is a circuit diagram of a circuit corresponding to the block diagram of FIG. 7A, according to an exemplary embodiment.

FIG. 8 illustrates a circuit diagram of a circuit 800 corresponding to a portion of the components of system 700 shown in FIG. 7A according to one exemplary embodiment. As described in further detail with respect to system 500 shown in FIG. 5A, the operating frequency of RF oscillator 710 is swept across a range of frequencies by connecting a sweep oscillator to a terminal of a varactor diode. RF oscillator 710 is connected to a tank circuit 715 and includes a BJT transistor 810 and an RF choke 805. The voltage signal measured at the emitter of transistor 810 is passed to a buffer amplifier 730 through a coupling capacitor 725 configured to loosely couple RF oscillator 710 to buffer amplifier 730. After processing by buffer amplifier 730, the signal is transmitted to envelope detector 735 for demodulation, and the demodulated signal is transmitted to the bandpass filter and amplifier for use in detecting the presence of an RFID device.

Some exemplary embodiments may be configured to detect the presence of an RFID device using a DC voltage measurement in an oscillator circuit. An RF oscillator in the detection system may be locked to a particular crystal frequency that approximately corresponds to the tuned frequency of RFID devices with which the detection system is configured to communicate. Stray capacitance coupled to a sense antenna of the detection system lowers the resonant frequency of the antenna circuit away from its design frequency. Some embodiments may use this property to differentiate between stray capacitance and RFID devices by intentionally tuning the sense antenna circuit above the operating frequency of the oscillator. When stray capacitance causes the oscillator tank circuit, which includes the sense antenna, to be detuned, the resonant frequency moves down, closer to the operating frequency of the oscillator. This causes the DC voltage sensed in the detection system to increase. When a tuned circuit of an RFID device is brought near the detection system, the mutual inductance shared with the oscillator tank circuit results in RF energy being coupled to the RFID device. This causes the DC voltage sensed in the detection system to decrease. The detection system can determine whether a change in voltage is due to an RFID device or stray capacitance based on whether the voltage has increased or decreased.

Figure 9:
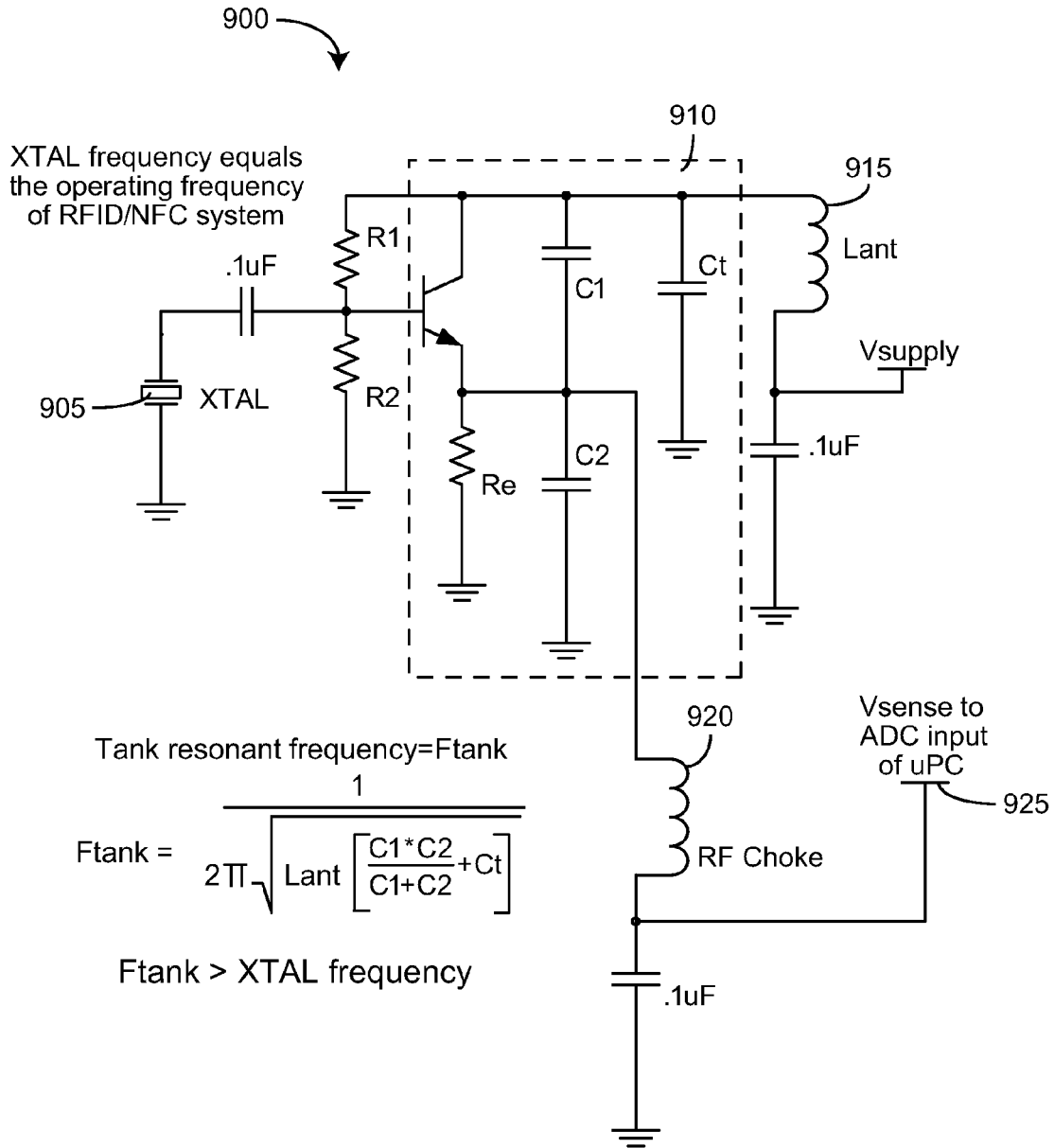
FIG. 9 is a circuit diagram of another RFID detection system, according to another exemplary embodiment.

FIG. 9 illustrates a circuit diagram of an oscillator circuit 900 for an RFID detection system configured to sense the presence of an RFID device based on a voltage measurement in the oscillator circuit of the detection system. Oscillator circuit 900 is crystal locked, such that the operating frequency of the oscillator is fixed at the operating frequency of a crystal 905, which is the operating frequency of the RFID system (e.g., 13.56 MHz). Oscillator circuit 900 includes a lumped element tank circuit 910 and a sense antenna 915. As discussed in detail above, when a second tuned circuit of an RFID device comes near the tuned circuit of oscillator circuit 900, a small amount of energy that is generated by oscillator circuit 900 will be magnetically coupled to the second tuned circuit, and the RF level at the resonant frequency will decrease due to the coupling of the two tuned circuits. When the RF level of oscillator circuit 900 shifts, the DC current drawn by oscillator circuit 900 also changes. This change represents a change in the AC load line or operating point, or "Q" point of the transistor oscillator. This causes a corresponding change in the DC voltage level of oscillator circuit 900. The signal is passed through an RF choke 920 to remove RF voltage at the emitter, and the DC voltage is measured by a microprocessor at an output 925 (e.g., through an ADC input circuit of the microprocessor). The host microcontroller may pulse the DC supply to oscillator circuit 900 to save current. When oscillator circuit 900 is activated, a DC voltage measurement may be conducted after the circuit has settled. This DC voltage may be stored in a memory and a running average may be computed. This may allow for the removal of environment influenced readings from noise or other stationary objects that may or may not be seen by the detection system. When a measurement is taken that sufficiently changes from the running average, the microprocessor may wake up the detection system and activate the RFID (e.g., NFC) transceiver to attempt communication with nearby devices. This running average technique may help prevent against false wakeups due to a changing environment.

Figure 10A:
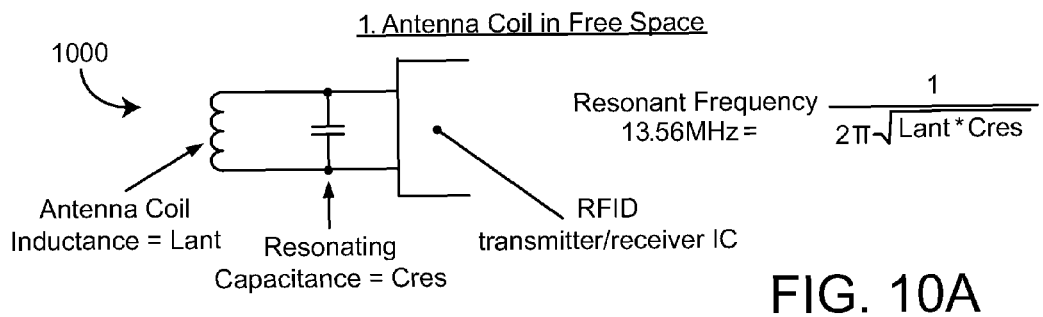
FIGS. 10A through 10C are circuit diagrams of partial circuits illustrating the effects of stray capacitance on an RFID detection system, according to exemplary embodiments.
Figure 10B:
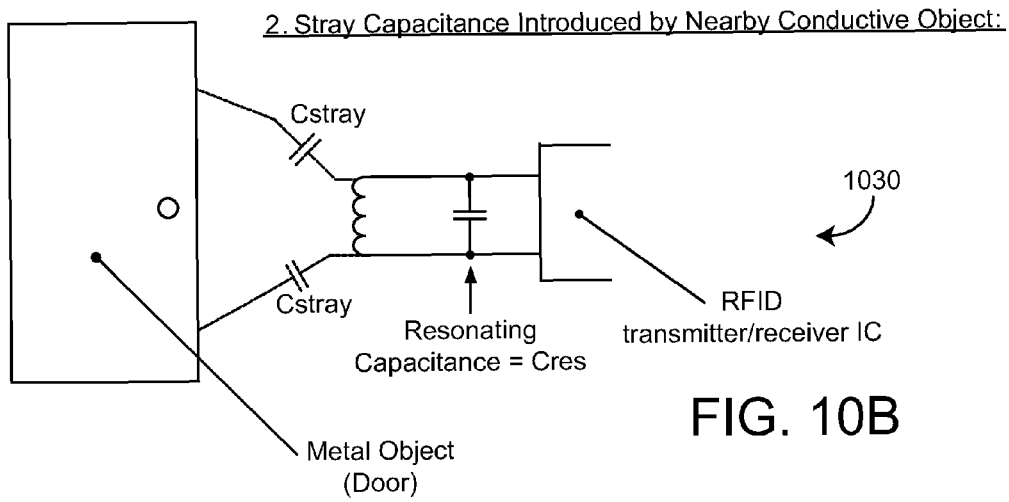
Figure 10C:
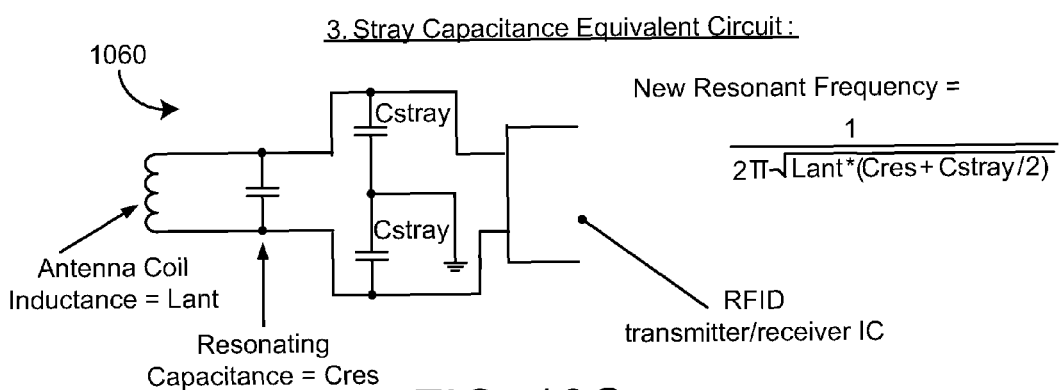

The resonant frequency of tank circuit 910 is shown in FIG. 9 as Ftank. The resonant frequency of the tank circuit is deliberately tuned higher than the operating frequency to allow for differentiation between stray capacitance and an actual RFID device. FIGS. 10A through 10C illustrate the effect of stray capacitance on the resonant frequency of the tank circuit of an oscillator circuit. FIG. 10A illustrates a representation of an antenna coil for an oscillating circuit in free space, including a mathematical representation of the resonant frequency of the antenna. FIG. 10B illustrates a source of stray capacitance being introduced near the oscillator circuit. FIG. 10C illustrates an equivalent circuit for the oscillator circuit after the stray capacitance has been introduced, including a mathematical representation of the new resonant frequency of the antenna after the stray capacitance has been included. Comparison of the mathematical representations shown in FIGS. 10A and 10C illustrates that stray capacitance causes the resonant frequency of the sense antenna to lower.

Oscillator circuit 900 differentiates between an RFID device and stray capacitance by deliberately tuning tank circuit 910 slightly higher than the operating frequency of the oscillating circuit 900. The resonant frequency of the tank circuit may be designed such that it is high enough that it does not drop below the crystal operating frequency when the maximum amount of stray capacitance is introduced. In some embodiments, a tank circuit resonant frequency approximately 10% higher than the operating frequency of the oscillating circuit may be used. Open loop gain and phase margin of the oscillator circuit does affect the amount that the oscillator tank circuit can be set off frequency and still achieve reliable starting of the oscillator circuit, so a proper resonant frequency for the tank circuit should be empirically optimized for different applications to achieve positive results.

When oscillator tank circuit 910, including sense antenna 915, is detuned due to stray capacitance, the resonant frequency moves down closer to the operating frequency of oscillator circuit 900, because the resonant frequency of tank circuit 910 and antenna 915 was intentionally tuned higher. When the resonant frequency of tank circuit 910 is shifted down towards the operating frequency of oscillator circuit 900, the RF amplitude of oscillator circuit 900 will increase because the tank circuit 910 resonant frequency has a larger real impedance and lesser reactive impedance at the operating frequency of the oscillator circuit 900. The DC current drawn by the supply voltage increases and the DC voltage at the emitter increases.

When the tuned circuit of an RFID device is coupled to oscillator circuit 900, the mutual inductance shared with tank circuit 910 will result in RF energy being coupled to the RFID device. The RF level of oscillator circuit 900 will decrease, causing the DC current drawn by the oscillator and the DC voltage at the emitter to decrease. Accordingly, a microprocessor to which the voltage output is connected can differentiate between stray capacitance and nearby RFID devices based on whether the voltage increases or decreases. If the measured voltage increases, the change is determined to be due to stray capacitance. If the measured voltage decreases, the change is determined to be due to a nearby RFID device, and the microprocessor is configured to wake the detection system from a sleep state into an active communication state.

Figure 11:
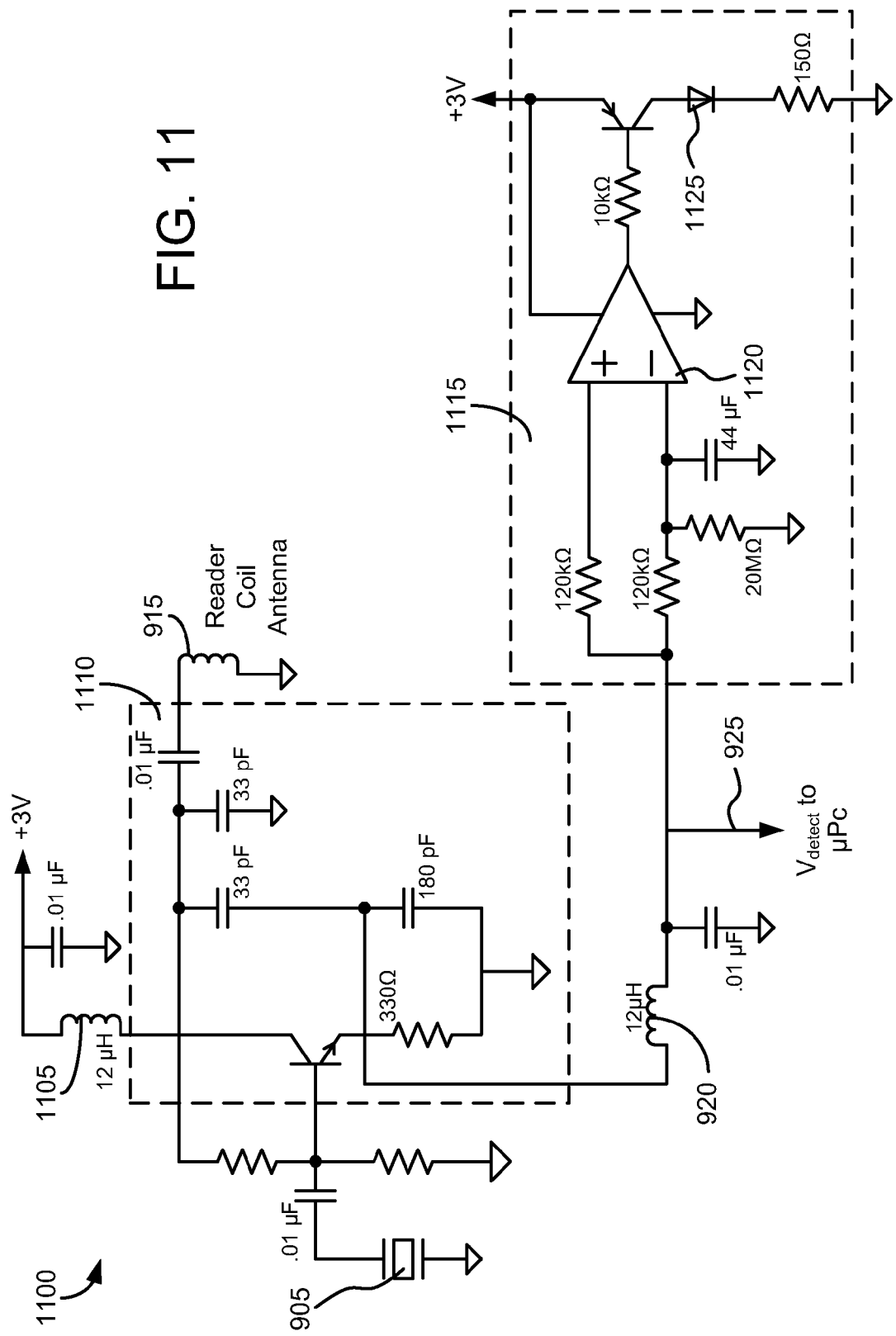
FIG. 11 is another circuit diagram relating to the RFID detection system described with respect to FIGS. 9-10C, according to another exemplary embodiment.

FIG. 11 illustrates a circuit diagram of another circuit 1100 that may be used to implement an RFID detection circuit configured to detect the presence of an RFID device based on a DC voltage level in the oscillator circuit according to another exemplary embodiment. Circuit 1100 includes several components that are similar to circuit 900. A transistor of oscillator circuit 1100 is coupled to a power source through an RF choke 1105. In addition to or as an alternative to providing an output of oscillator circuit 1100 to a microprocessor configured to activate a wakeup condition, the output may be provided to an analog comparator circuit 1115 configured to receive the voltage signal, to compare it to a reference voltage using a comparator 1120, and to output a signal representative of whether the voltage has increased or decreased for use in determining whether to activate a wakeup condition in the detection system. The illustrated exemplary embodiment includes an LED 1125 configured to provide a visual indication of whether an RFID device has been determined to be present for demonstration purposes.

In various exemplary embodiments, any type of oscillator topology may be substituted for the topology shown in FIGS. 9 and 11. For example, instead of a common base amplifier, a common collector or common emitter topology could be used. If the oscillator circuit is based on a JFET, common gate, common drain, or common source topologies could be used.

Various embodiments provided herein may be beneficial for different applications. For example, the embodiments described with respect to FIGS. 9-11 may provide lower protection against false wakeups but may be the least expensive solution and may provide robust protection against noise. An electrostatically shielded antenna may be used to help differentiate between stray capacitance and an RFID device in such implementations. The embodiments described with respect to FIGS. 3-6 may be very robust against both noise and false wakeups but are more complex and expensive than the embodiments described with respect to FIGS. 9-11. Accordingly, different embodiments may be more or less ideal for use in different applications depending on the constraints of the applications.

Figure 12:
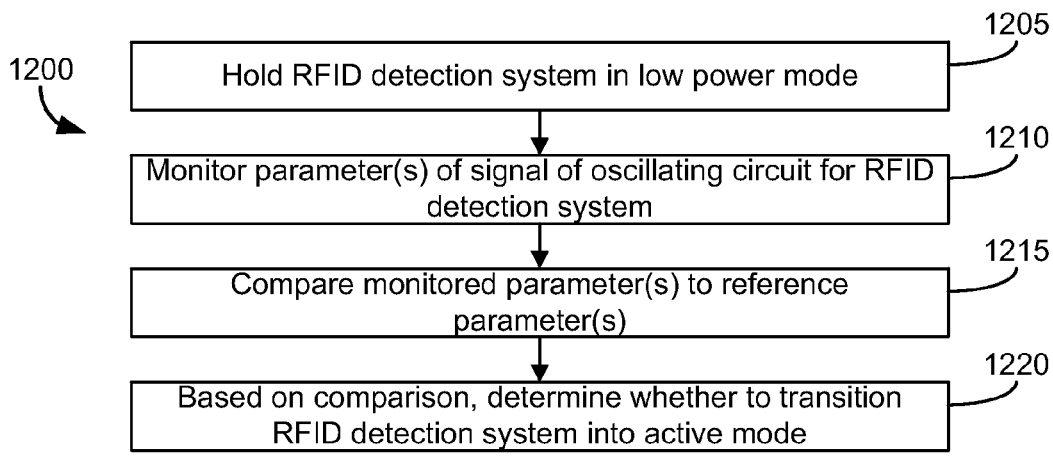
FIG. 12 is a flow diagram of a process that may be performed using an RFID detection system, according to an exemplary embodiment.

Referring now to FIG. 12, a flow diagram of a process 1200 that may be performed using an RFID detection system is shown according to an exemplary embodiment. Process 1200 includes holding the RFID detection system in a low power mode (1205). In the low power mode, the RFID detection system may be configured to not actively attempt to communicate with nearby RFID devices. The RFID detection system may include an oscillating circuit. One or more parameters of a signal of the oscillating circuit may be monitored (1210). The one or more monitored parameters may be compared to one or more reference parameters (1215). Based on the comparison, it may be determined whether to transition the RFID detection system from the low power mode into an active communication mode (1220). In the active communication mode, the RFID detection system may be configured to actively attempt to communicate with nearby RFID devices.

Figure 13:
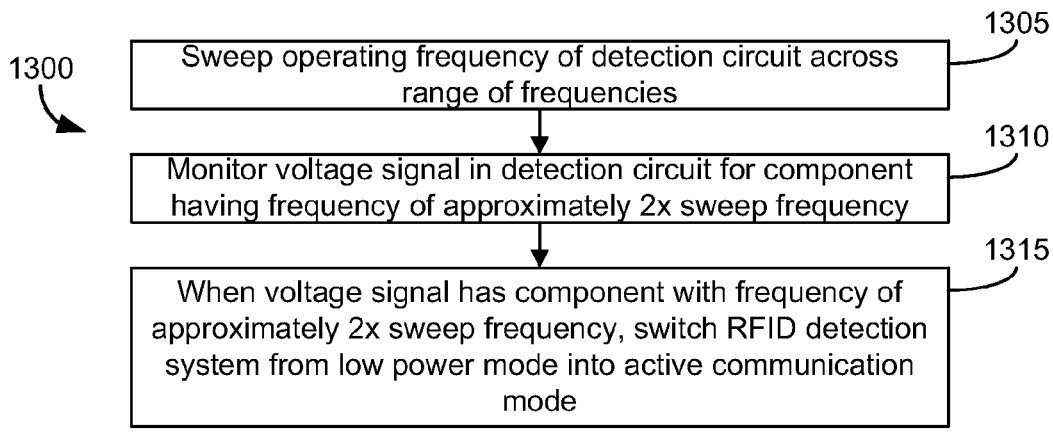
FIG. 13 is a flow diagram of another process that may be performed using an RFID detection system, according to an exemplary embodiment.

Referring now to FIG. 13, a flow diagram of another process 1300 that may be performed using an RFID detection system is shown according to an exemplary embodiment. Process 1300 includes sweeping an operating frequency of a detection circuit across a range of frequencies (1305). The detection circuit is configured to detect the presence of one or more RFID devices near an RFID detection system. The RFID devices have a resonant frequency. The range of frequencies includes the resonant frequency of the one or more one or more RFID devices. The sweeping is performed at a sweep frequency. A voltage signal in the detection circuit may be monitored to determine whether the voltage signal includes a signal component having a frequency of approximately twice the sweep frequency (1310). When it is determined that the voltage signal includes a signal component having a frequency of approximately twice the sweep frequency, the RFID detection system may be switched from a low power mode into an active communication mode (1315).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media (e.g., tangible and/or non-transitory) for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, flash memory, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

I claim:

1. An RFID detection system, comprising:
   a detection circuit including:
      a single antenna configured to detect a presence of one or more RFID devices near the RFID detection system, the one or more RFID devices having a resonant frequency; and
      an oscillation circuit configured to sweep an operating frequency of the detection circuit across a range of frequencies, the range of frequencies including the resonant frequency of the one or more RFID devices, the sweeping comprising performing a plurality of oscillation cycles, each oscillation cycle passing through the resonant frequency twice;
   a filter circuit configured to:
      receive a signal from the detection circuit;
      remove one or more first components of the signal corresponding to one or more harmonics of a frequency of two times an oscillation frequency at which the oscillation circuit completes each oscillation cycle; and
      output one or more second components of the signal in a band around the frequency of two times the oscillation frequency;
   a tone detection circuit configured to:
      receive the one or more second components from the filter circuit; and
      monitor the one or more second components to determine whether the one or more second components include a voltage signal component appearing twice during a complete oscillation cycle of the sweeping; and
   a comparator configured to:
      compare the voltage signal component appearing twice during the complete oscillation cycle to a reference voltage, and
      switch the RFID detection system from a low power mode into an active communication mode in response to the voltage signal component appearing twice during the complete oscillation cycle of the sweeping and the voltage signal component exceeding the reference voltage.

2. The RFID detection system of claim 1, wherein the detection circuit is configured such that the presence of one or more RFID devices near the RFID detection system causes a change in the voltage signal twice during the complete oscillation cycle at the resonant frequency of the one or more RFID devices and one or more objects other than the one or more RFID devices cause a change in the voltage signal across the range of frequencies.

3. The RFID detection system of claim 1, wherein, in the low power mode, the detection circuit draws a current between 1 μA and 25 μA from an energy storage device of the RFID detection system.

4. The RFID detection system of claim 1, wherein the RFID detection system is configured to be embedded within a locking device and used in unlocking the locking device based on one or more signals received from the one or more RFID devices near the RFID detection system when the RFID detection system is in the active communication mode.

5. The RFID detection system of claim 4, wherein the locking device comprises a padlock.

6. A method, comprising:
sweeping an operating frequency of a detection circuit with an oscillation circuit across a range of frequencies, wherein a single antenna of the detection circuit is configured to detect a presence of one or more RFID devices near an RFID detection system, wherein the one or more RFID devices have a resonant frequency, wherein the range of frequencies includes the resonant frequency of the one or more one or more RFID devices, and the sweeping comprising performing a plurality of oscillation cycles, each oscillation cycle passing through the resonant frequency twice;
receiving, by a filter circuit, a signal from the detection circuit;
removing, by the filter circuit, one or more first components of the signal corresponding to one or more harmonics of a frequency of two times an oscillation frequency at which the oscillation circuit completes each oscillation cycle;
outputting, by the filter circuit to a tone detection circuit, one or more second components of the signal in a band around the frequency of two times the oscillation frequency;
monitoring, by the tone detection circuit, the one or more second components to determine whether the one or more second components include a voltage signal component appearing twice during a complete oscillation cycle of the sweeping;
comparing, by a comparator, the voltage signal component appearing twice during the complete oscillation cycle to a reference voltage; and
switching the RFID detection system from a low power mode into an active communication mode in response to the voltage signal component appearing twice during the complete oscillation cycle of the sweeping and the voltage signal component exceeding the reference voltage.

7. The method of claim 6, further comprising estimating a relative distance between the RFID detection system and one of the one or more RFID devices based on a magnitude of the signal component appearing twice during the complete oscillation cycle of the sweeping.

8. The method of claim 6, wherein the detection circuit is configured such that the presence of one or more RFID devices near the RFID detection system causes a change in the voltage signal twice during the complete oscillation cycle at the resonant frequency of the one or more RFID devices and one or more objects other than the one or more RFID devices cause a change in the voltage signal across the range of frequencies.

9. The method of claim 6, wherein, in the low power mode, the detection circuit draws a current between 1 μA and 25 μA from an energy storage device of the RFID detection system.

10. The method of claim 6, wherein the RFID detection system is configured to be embedded within a locking device, and wherein the method further comprises unlocking the locking device based on one or more signals received from the one or more RFID devices near the RFID detection system when the RFID detection system is in the active communication mode.

11. The method of claim 10, wherein the locking device comprises a padlock.

12. An RFID detection system, comprising:
a detection circuit including:
a single antenna configured to detect a presence of one or more RFID devices near the RFID detection system, the one or more RFID devices having a resonant frequency; and
an oscillation circuit configured to sweep an operating frequency of the detection circuit across a range of frequencies, the range of frequencies including the resonant frequency of the one or more RFID devices, the sweeping comprising performing a plurality of oscillation cycles, each oscillation cycle passing through the resonant frequency twice;
a filter circuit configured to:
receive a signal from the detection circuit;
remove one or more first components of the signal corresponding to one or more harmonics of a frequency of two times an oscillation frequency at which the oscillation circuit completes each oscillation cycle; and
output one or more second components of the signal in a band around the frequency of two times the oscillation frequency;
a tone detection circuit configured to:
receive the one or more second components from the filter circuit; and
identify a voltage signal component of the one or more second components appearing twice during a complete oscillation cycle of the sweeping; and
a comparator configured to:
determine an amplitude of the voltage signal component appearing twice during the complete oscillation cycle of the sweeping;
compare the amplitude to a reference voltage level; and
switch the RFID detection system from a low power mode into an active communication mode in response to the voltage signal component appearing twice during the complete oscillation cycle of the sweeping and the amplitude exceeding the reference voltage level; and
wherein the detection circuit is configured to estimate a relative distance between the RFID detection system and one of the one or more RFID devices based on the amplitude of the voltage signal component appearing twice during the complete oscillation cycle of the sweeping.

13. The RFID detection system of claim 12, wherein the detection circuit is configured such that the presence of one or more RFID devices near the RFID detection system causes a change in the voltage signal twice during the complete oscillation cycle at the resonant frequency of the one or more RFID devices and one or more objects other than the one or more RFID devices cause a change in the voltage signal across the range of frequencies.

14. The RFID detection system of claim 12, wherein, in the low power mode, the detection circuit draws a current between 1 μA and 25 μA from an energy storage device of the RFID detection system.

15. The RFID detection system of claim 12, wherein the RFID detection system is configured to be embedded within a locking device and used in unlocking the locking device based on one or more signals received from the one or more RFID devices near the RFID detection system when the RFID detection system is in the active communication mode.

16. The RFID detection system of claim 15, wherein the locking device comprises a padlock.

* * * * *